United States Patent
McGowan

(12) 
(10) Patent No.: US 12,314,192 B2
(45) Date of Patent: May 27, 2025

(54) MULTIPLE LEVEL SOC RESOURCE ALLOCATION AND ISOLATION SYSTEM AND METHOD

(71) Applicant: NXP B.V., Eindhoven (NL)

(72) Inventor: Robert Anthony McGowan, Cedar Park, TX (US)

(73) Assignee: NXP B.V., Eindhoven (NL)

( * ) Notice: Subject to any disclaimer, the term of this patent is extended or adjusted under 35 U.S.C. 154(b) by 190 days.

(21) Appl. No.: 18/203,434

(22) Filed: May 30, 2023

(65) Prior Publication Data

US 2024/0403247 A1    Dec. 5, 2024

(51) Int. Cl.
| | | |
|---|---|---|
| *G06F 13/14* | (2006.01) | |
| *G06F 9/46* | (2006.01) | |
| *G06F 9/50* | (2006.01) | |
| *G06F 13/24* | (2006.01) | |

(52) U.S. Cl.
CPC .............. *G06F 13/14* (2013.01); *G06F 9/468* (2013.01); *G06F 9/5011* (2013.01); *G06F 13/24* (2013.01); *G06F 2213/0038* (2013.01)

(58) Field of Classification Search
CPC .......... G06F 9/468; G06F 9/50; G06F 9/5005; G06F 9/5011; G06F 9/5061; G06F 13/12; G06F 13/24; G06F 21/70; G06F 2213/0038

See application file for complete search history.

(56) References Cited

U.S. PATENT DOCUMENTS

| | | |
|---|---|---|
| 7,013,484 B1 | 3/2006 | Ellison et al. |
| 8,312,459 B2 | 11/2012 | Smith et al. |
| 8,429,191 B2 | 4/2013 | Desai et al. |
| 8,826,271 B2 | 9/2014 | Hussain et al. |
| 9,165,143 B1 | 10/2015 | Sanders et al. |
| 9,202,061 B1 | 12/2015 | Polzin et al. |
| 10,275,259 B1 | 4/2019 | Jain |

(Continued)

FOREIGN PATENT DOCUMENTS

| | | |
|---|---|---|
| CN | 110727636 A | 1/2020 |
| JP | 2019053720 A | 4/2019 |

OTHER PUBLICATIONS

O'Brien, Scott. "Extended Resource Domain Controller xRDC." Oct. 2018. pp. 1-55. NXP Training Material. AMF-AUT-T3382.

(Continued)

*Primary Examiner* — Thomas J. Cleary

(57) ABSTRACT

An SoC with a multiple level resource isolation system including initiator devices that conduct transactions with addressed slave devices via an interconnect, access identifier assignment (AIDA) devices that append an access identifier (AID) including a group identifier (GID) and a domain identifier (DID) to each transaction of a corresponding initiator device, access control (AC) devices that control access to slave devices based on an AID provided with a transaction, a partition manager that programs GIDs into the AIDA and AC devices for assigning slave devices to groups, and group managers that program DIDs into the AIDA devices for each matching GID programmed therein, and that program the AC devices with access rights to one or more DIDs for each slave device assigned to a corresponding group with a matching GID programmed therein.

20 Claims, 11 Drawing Sheets

(56) References Cited

U.S. PATENT DOCUMENTS

| | | |
|---|---|---|
| 10,394,731 B2 | 8/2019 | Davis et al. |
| 10,552,168 B2 | 2/2020 | Huntley et al. |
| 10,853,134 B2 | 12/2020 | Javre et al. |
| 11,366,906 B2 | 6/2022 | Smith et al. |
| 2004/0230818 A1 | 11/2004 | Craft |
| 2009/0077201 A1* | 3/2009 | Nakamura .......... H04L 67/1097 709/219 |
| 2011/0191562 A1 | 8/2011 | Chou et al. |
| 2015/0277949 A1 | 10/2015 | Loh et al. |
| 2016/0202994 A1 | 7/2016 | Swanson et al. |
| 2016/0210260 A1* | 7/2016 | Case ................... G06F 9/5011 |
| 2017/0168841 A1 | 6/2017 | Ansari |
| 2018/0075258 A1 | 3/2018 | Circello et al. |
| 2020/0287742 A1 | 9/2020 | Sai et al. |
| 2021/0160134 A1* | 5/2021 | Anquet ................ G06F 15/177 |
| 2021/0397714 A1 | 12/2021 | Halter et al. |

OTHER PUBLICATIONS

"K32W1480 Reference Manual" NXP Semiconductors, Reference Manual. Supports K32W1480xx. Document Identifier: K32W1480RM. Rev. 4, Nov. 2022. pp. 91-100.

Stephens, Jim. "Extended Resource Domain Controller 2 Block Guide (XRDC2)" Rev 1.1, Feb. 2015. Freescale Semiconductor pp. 1-30.

Mueller, S. et al. "Extended Resource Domain Controller." Apr. 2018, NXP. pp. 1-66. S32S247—XRDC.

* cited by examiner

MULTIPLE LEVEL SOC RESOURCE ALLOCATION AND ISOLATION SYSTEM AND METHOD

BACKGROUND

Field

The present disclosure relates in general to semiconductor devices, and more particularly to a multiple level System-on-a-Chip (SoC) resource allocation and isolation scheme.

Description of the Related Art

Isolation of resources is an essential component to the needs of safety, security, and robustness of software. Resources generally refer to initiator devices (e.g., cores, bus masters, engines, etc.) and slave devices (e.g., memory, input/output devices, registers, etc.) that are collectively used to conduct transactions for performing operations in accordance with software. As functions that were previously on separate devices, often developed by different vendors, are integrated onto one device, the complexity of having one entity manage the isolation for all components becomes complex and would require interaction between often competing developers to put a single unified scheme in place. Building and maintaining this single control point becomes difficult.

Despite the integration of hardware onto one device, software developers would like to continue to develop their software as they did when they each operated or otherwise controlled a separate device. The software often comes from different vendors so that coordination of the isolation management and the safety management becomes problematic. Existing SoC configurations have provided isolation mechanisms that require a unified schema that is coordinated between all parties. Whenever any change is made, however, the unified isolation scheme must change potentially creating additional test cycles or issues for all software requiring coordination with corresponding software developers.

BRIEF DESCRIPTION OF THE DRAWINGS

Embodiments of the present invention are illustrated by way of example and are not limited by the accompanying figures. Similar references in the figures may indicate similar elements. Elements in the figures are illustrated for simplicity and clarity and have not necessarily been drawn to scale.

DETAILED DESCRIPTION

Resources include initiator devices and slave devices that conduct transactions to perform functions and operations of a system. Initiator devices may include bus masters such as processors, processing devices, cores, accelerators, or any other processing structure that executes software or firmware or the like such as are typically provided in the form of instructions or the like. Slave devices may include any type of device used by an initiator device, such as memory, registers, peripherals including input/output (I/O) devices, etc. Memory is generally in the form of random-access memory (RAM) which may be subdivided in any suitable manner. Some devices are hybrid in nature, such as direct memory access (DMA) controllers and Ethernet controllers and the like. DMA and Ethernet controllers, for example, may include an engine that operates as an initiator device for performing transactions, and channel registers that are accessed and programmed as slave peripheral devices for setting parameters used for the corresponding transactions.

An SoC with a multiple level resource isolation system according to various embodiments includes multiple initiator devices, a set of corresponding access identifier assignment (AIDA) devices, multiple slave devices, and a set of corresponding access control (AC) devices each configured to control access to at least one slave device based on an access identifier (AID) provided with a transaction provided by an initiator. Each initiator device is configured to conduct transactions with the slave devices via an interconnect. Each AIDA device is configured to append an AID to each transaction of a corresponding initiator device, in which each AID includes a group identifier (GID) and a domain identifier (DID). Each GID uniquely identifies a corresponding one of multiple groups.

At least one of the initiator devices is configured as a partition manager that programs GIDs into the AIDA devices, and that programs GIDs into the AC devices for assigning each of the slave devices to one of the groups. Each of a set of initiator devices is configured by the partition manager as a group manager for managing a corresponding group having the same GID. Each group manager is configured to program at least one DID into one or more of the AIDA devices for each matching GID programmed therein, and is configured to program one or more of the AC devices with access rights to one or more DIDs for each slave device assigned to a corresponding group with a matching GID programmed therein.

Figure 1:
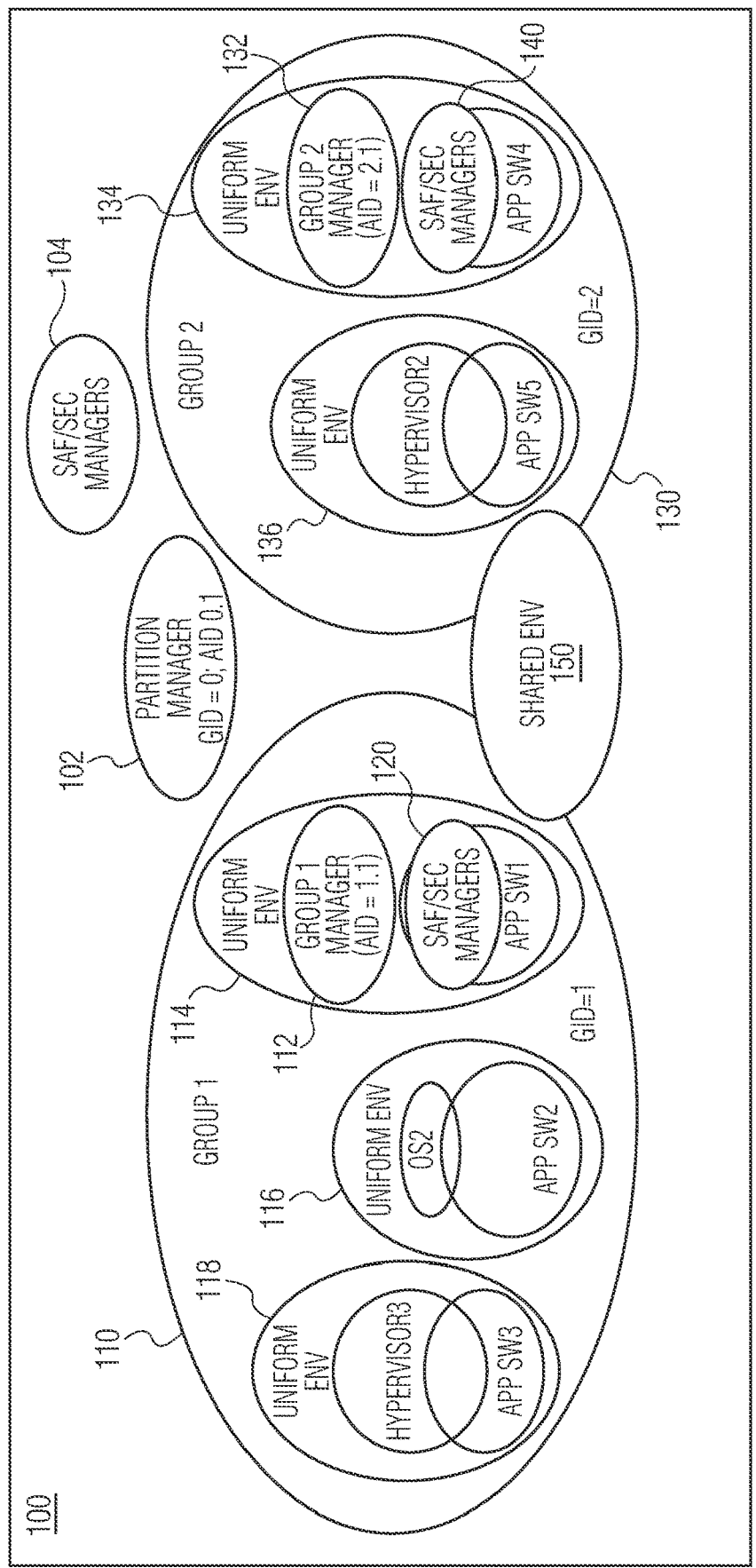
FIG. 1 is a simplified block diagram depicting resources integrated on a semiconductor chip or integrated circuit (IC) that are subdivided by a partition manager into separate and independent groups according to one embodiment.

FIG. 1 is a simplified block diagram depicting resources integrated on a semiconductor chip or integrated circuit (IC) 100 that are subdivided by a partition manager into separate and independent groups according to one embodiment. As used herein, a "group" is defined as a separate division, partition, cluster, or organization of resources, in which each group may consist of uniform (e.g., homogenous) or heterogenous sets or collections of initiator and slave devices. A group manager of each group may then control the isolation and fault response for resources within each group without coordination with other group managers and without the need to integrate its processes (or API calls for services or the like) into a global manager. Within a group, isolation schemes of domains, memory management units (MMUs), and memory protection units (MPUs) may still be leveraged as in conventional configurations. As used herein, a "domain" is defined as a partition of the resources that are assigned to a group.

Upon power-up or reset (POR) of the IC 100, a partition manager 102 is executed which defines the subdivision of resources including memory. In particular, the partition manager 102 divides memory ranges and separates other resources into multiple groups, such as, for example, a first group 110 (group 1) and a second group 130 (group 2). Although only two groups 110 and 130 are shown, any number of separate and independent groups may be created by the partition manager 102. A group is a first level of division of resources in which each group may be thought of as a mini-SoC on the IC 100 including a subset of resources and a corresponding allocation of memory which operates as though it is located on a separate IC or chip. The groups are distinguishable from each other by a digital identifier (ID), specifically a group ID (GID). As shown, the group 110 is assigned GID=1 and group 130 is assigned GID=2. The partition manager 102 is a separate entity from each of the groups and is assigned a unique group identifier of GID=0 to distinguish it from the groups.

Once the resources of a group have been allocated, the partition manager 102 may initiate execution of a group manager for that group which then subdivides allocated resources of the group into different partitions with different domains each with a unique domain identifier (DID). As shown, a group manager 112 (group 1 manager) manages the resources of the group 110 and a group manager 132 (group 2 manager) manages the resources of the group 130. The subdivision of a group into multiple domains is a second level of division of resources in which each domain is a further partition of the resources that are assigned to a group. The DID values are used to distinguish one domain from another within a given group in which different DID values may be assigned to different bus masters or cores or other initiators running different operating systems (OSs) or different virtual managers (VMs) and the like and may be used to distinguish access rights including different safety levels, different security levels, different sets of privileges, etc. In one embodiment, each of the managers, including the partition manager 102 and the group managers 112 and 132, are assigned a DID value of 1 in which the managers are distinguished from each other by different GID values. In general, the partition manager 102 has a unique default DID=1 and as part of the setup, the partition manager 102 assigns unique DID values to each of the group managers, such as DID=1 for simplicity. The combination of GID and DID forms an access ID (AID), in which AID has the form GID.DID. The partition manager 102 has AID=0.1, the group manager 112 has AID=1.1, and the group manager 132 has AID=2.1.

Figure 2:
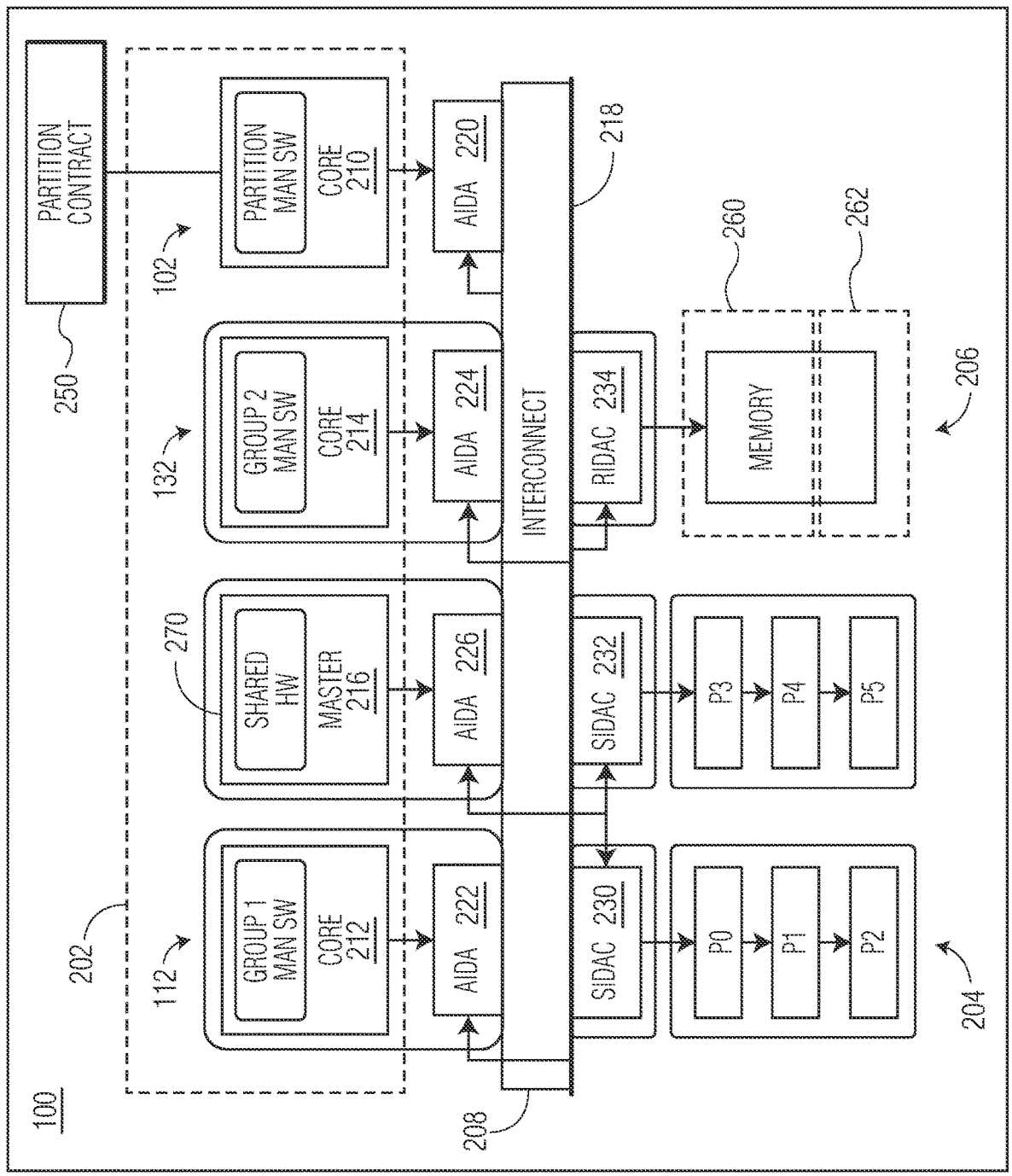
FIG. 2 is a more detailed block diagram of resource circuitry and control circuitry used for subdividing the resources of the IC of FIG. 1 according to one embodiment.

The partition manager 102 activates the group manager 112 by initiating execution of group manager software by a selected processor or core of the group 110 (e.g., FIG. 2, core 212). Once activated, the group manager 112 subdivides the resources of the group 110 into multiple divisions 114, 116, and 118, in which the core executing the group manager 112 is part of one of the division, such as the division 114 as shown. Each of the divisions 114, 116, and 118 may include a subset of the resources of the group 110 that collectively form a cohesive set of resources for performing a designated function or set of functions. The divisions 114, 116, and 118 may each form a uniform environment (ENV) which is an organization of one or more initiates (e.g., bus masters, cores, etc.) sharing the same instruction set architecture (ISA), safety level, and either a hypervisor or operating system (OS). As a nonlimiting example, the division 114 may include one or more microcontroller (MCU) cores, the division 116 may include one or more micro-processing unit (MPU) cores operating with a different ISA, and the division 118 may include one or more x86 type cores operating with yet another ISA. A hypervisor may be configured as type 1 (bare metal) or type 2 (hosted) and may be used in a virtual machine (VM) or the like.

As shown, a core of the division 114 executes the software of the group manager 112 that may include operating system functions for executing other software applications, such as a software application App SW1. The division 116 is shown executing an operating system OS1 that manages operation of another software application App SW2. The division 118 is shown executing a hypervisor hypervisor1 that manages operation of another software application App SW3.

In a similar manner, the partition manager 102 activates a group manager 132 by starting execution of group manager software by a selected processor or core of the group 130 (e.g., FIG. 2, core 214). Once activated, the group manager 132 subdivides the resources of the group 130 into multiple partitions 134 and 136, in which the core executing the group manager 132 is part of the partition 134 as shown. Each of the partitions 134 and 136 may include a subset of the resources of the group 130 that collectively form a cohesive group of resources for performing a designated function or set of functions in a similar manner as described for the group 110. The partitions 134 and 136 are each formed as a uniform ENV in a similar manner. A core of the partition 134 executes the software of the group manager 132 that may include operating system functions for executing other software applications, such as a software application App SW4. The partition 136 is shown executing a hypervisor hypervisor2 that manages operation of another software application App SW5.

As described further herein, each group manager of each group, such as the group managers 112 and 132, may assign access privileges that enable sharing of resources between two or more divisions or between different domains. In addition, resources may be shared between multiple groups, such as between the groups 110 and 130. A shared ENV 150 is shown spanning the groups 110 and 130 representing shared resources therebetween as further described herein.

It is noted that allocation of resources to the groups can either be done all together by the partition manager 102 in the beginning before starting any of the group managers, or incrementally, meaning that one group can be allocated and started, and then a second group is allocated and started, and so forth. After completing the first level subdivision task and initiation of all of the corresponding group managers, the partition manager 102 may exit or may otherwise remain active in case one or more of the groups needs to be rebooted during operation.

In case any of the groups 110 or 130 or any other groups of the IC 100 needs to be rebooted, the partition manager 102 (along with any other helper software that may be defined) may be configured to effectively restart or reboot a deactivated group. The partition manager 102 restarts the group's resources by changing or resetting its GID, by clearing or resetting the deactivated group's memory, by clearing or resetting any of the group's registers, by re-assigning resources to the group, and then by restarting it. Once restarted, the rebooted group manager may assign DID values to subdivide its resources as previously described.

As described further herein, the partition manager 102 and the group managers 112 and 132 program configuration registers or the like to govern resource isolation and assignment. Changes to the configuration registers or other programming which may have an effect on isolation raises both security and safety issues. Safety and security (SAF/SEC) managers 104 operate as system level safety and security functions that either monitor general functions of the IC 100 or receive communications from the groups 110 and 130. App SW1 may perform various functions including, for example, executing SAF/SEC managers 120 that monitor safety and security conditions of the group 110 and reporting safety or security conditions to the system level safety manager 104. App SW4 may perform various functions including, for example, operating SAF/SEC managers 140 that monitor safety or security conditions of the group 130 and reporting safety or security conditions to the system level safety manager 104.

Although not shown, monitoring circuitry or the like monitors the configuration registers and other programming that may have an impact on either safety or security and sets one or more corresponding modification alarm (MA) flags. The setting of a MA flag may be configured to generate an interrupt to the corresponding SAF/SEC managers 120 or 140 which may then be executed to re-verify the configuration registers and other settings or conditions to determine whether any security or safety issues exist that need attention. Any such issues may be reported to the SAF/SEC managers 104 and ultimately handled in an appropriate manner. It is noted that MA flags may simply be indicators of change that may or may not raise safety or security issues. After any safety or security issues are reviewed or handled by software, the MA flag(s) may then be cleared. There may be separate safety and security alarms that are triggered for the same or similar conditions, such as changing of a configuration register. Separate flags allow different software to be executed to acknowledge and clear the interrupts without disturbing other flags.

It is noted that the IC 100 may be used for many different types of applications including, for example without being limiting, automotive applications or the like. The IC 100 may implement multiple electronic control units (ECUs) of an automotive application such as, for example, a first ECU functioning as an engine control module, another ECU for performing braking functions, another ECU for performing lighting functions, another ECU for performing radar vision functions, and so on. Each ECU application could be instantiated a separate group to establish its own isolation schema without coordination with other ECU applications.

FIG. 2 is a more detailed block diagram of resource circuitry and control circuitry used for subdividing the resources of the IC 100 according to one embodiment. The IC 100 includes multiple initiators 202 communicatively coupled to a set of slave devices via an interconnect 208, in which the slave devices include peripherals 204 and memory 206. The initiators 202 may include processors, processing devices, cores, accelerators, or any other processing structure that executes software, firmware, or other code as previously described. As shown, the initiators 202 include a system management core 210 and two additional cores 212 and 214, and a general bus master device 216 such as a DMA controller with a DMA engine or an Ethernet controller with an Ethernet engine the like. The peripherals 204 generally include input, output, or I/O devices that operate as slaves to an initiator including registers and communication devices and the like. The interconnect 208 may be configured in any suitable manner, such as a communication bus or set of switches or other such electronic communication interface. The interconnect 208 includes a configuration bus 218 that is used by the partition and group managers to access resource partitioning devices for performing first-level and second-level resource assignments as described further herein.

Bus transactions conducted by the cores 210, 212, and 214, and the bus master device 216 using or accessing other resources via the interconnect 208 are supplemented by access ID assignment (AIDA) devices 220, 222, 224, and 226, respectively. Although shown positioned between the respective initiators 202 and the interconnect 208, each of the AIDA devices 220-226 instead selects and attaches an AID (GID.DID) to each transaction conducted by the corresponding initiator 202 in which the AID is used as an authentication for either allowing or denying access to an addressed slave device. The peripherals 204 are interfaced with the interconnect 208 via a corresponding one of slot-based ID access control (SIDAC) devices 230 and 232. The memory 206 is interfaced with the interconnect 208 via a range-based ID access control (RIDAC) device 234. SIDAC and RIDAC devices are different types of firewalls that are specialized to optimally provide the degree of isolation needed for the slave devices as further described herein. A SIDAC device is configured to enable isolation over regular fixed-sized address regions, whereas a RIDAC device is more flexible and is configured to enable isolation over programmable-sized regions. SIDAC devices are suitable for most peripherals and RIDAC devices are suitable for memory and some peripheral devices as further described herein. The SIDAC and RIDAC devices may generally be referred to as "xIDAC" devices in which each xIDAC device operates as a firewall to check the access rights of each transaction being attempted to access a corresponding slave device using an AID. Each of the AIDA and xIDAC devices are accessible to the partition and group managers via the configuration bus 218 for programming.

Upon POR, partition management software is loaded on and executed by the core 210 to form the partition manager 102. It is noted that the partition management software may be executed on any suitable core such as, for example, a system management core or the like. The AIDA device 220 incorporates the AID (0.1) of the partition manager 102 according to any suitable manner, such as a reset option for the AIDA device 220, hardcoded into the AIDA device 220 or its bus interface, or programmed into the AIDA device 220 by the partition manager 102 via the configuration bus 218. The partition manager 102 may access a partition contract 250 which incorporates a list of information that defines the subdivision of resources including memory. Using the information in the partition contract 250, the partition manager 102 programs GID values into configuration registers of each of the AIDA and xIDAC devices accordingly to perform the first level assignment of the peripherals 204, the initiators 202, and global memory ranges of the memory 206, into different groups, such as, for example, the groups 110 and 130. The partition manager 102 accesses each of the AIDA and xIDAC devices via the configuration bus 218.

After the partition manager 102 programs the AIDA and xIDAC devices for a given group, it loads group management software into a core and starts the group manager to perform access permissions for that group. As previously described, allocation of resources to the groups may first be completed before activating the group managers, or allocation and activation of each group may be performed incrementally. As shown, group 1management software is loaded onto the core 212 and executed to form the group manager 112 and group 2 management software is loaded onto the core 214 and executed to form the group manager 132. When started, each of the group managers 112 and 132 programs DID values into configuration registers of the AIDA devices that have been assigned to the respective groups, including, for example, the AIDA devices 220-226, and sets permissions for those DIDs within configuration register of each of the xIDAC devices that have been assigned to the respective groups, including, for example, the SIDAC devices 230 and 232 and the RIDAC device 234. The group managers 112 and 132 run independently and completely separate from each other, and each accesses the AIDA and xIDAC devices via the configuration bus 218. The group managers 112 and 132 program configuration registers of the AIDA and xIDAC devices that have been assigned to the respective managers to establish access permissions and controls as further described herein.

The illustrated peripherals 204 include individual peripherals labelled P0, P2, . . . , P5, in which peripherals P0-P2 are interfaced with the interconnect 208 via SIDAC device 230 and peripherals P3-P5 are interfaced with the interconnect 208 via SIDAC device 232. Configuration registers of each of the SIDAC devices 230 and 232 may be programmed by the group managers to assign access mechanisms and control to the peripherals of corresponding groups. For example, the configuration registers of the SIDAC device 230 assigned to group 110 may be programmed by the group manager 112 to assign access mechanisms and control to the peripherals P0 and P2 to the group 110, and configuration registers of the SIDAC device 232 assigned to group 110 may be programmed by the group manager 112 to assign access mechanisms and control to the peripheral P5 to the group 110. In a similar manner, configuration registers of the SIDAC device 230 assigned to the group 130 may be programmed by the group manager 132 to assign access mechanisms and control to the peripheral P1 to the group 130, and configuration registers of the SIDAC device 232 assigned to group 130 may be programmed by the group manager 132 to assign access mechanisms and control to the peripherals P3 and P4 to the group 130. The configuration registers of each SIDAC device are assigned by the partition manager 102 for use by a designated and thus authorized group manager, which prevents other group managers from accidentally or maliciously modifying isolation rules established by the authorized group manager.

The partition manager 102 programs the RIDAC device 234 to subdivide the memory 206 into different global memory ranges and authorizes one or more groups access to each global memory range. In addition, configuration registers of the RIDAC device 234 assigned to group 110 are programmed by the group manager 112 to assign access mechanisms and control to a memory segment 260 of the memory 206 to the group 110, and configuration registers of the RIDAC device 234 assigned to group 130 are programmed by the group manager 132 to assign access mechanisms and control to a memory segment 262 of the memory 206 to the group 130. As described further herein, the memory segments assigned by a group can only reside within the global memory ranges assigned by the partition manager to that group. The illustrated partitioning of the memory 206 is solely for purposes of example in which it is understood that the memory 206 may be subdivided in any suitable manner for any number of groups. In a similar manner as described for the SIDAC devices, the configuration registers of each RIDAC device are assigned by the partition manager 102 for use by a designated and thus authorized group manager, which prevents other group managers from accidentally or maliciously modifying isolation rules established by the authorized group manager.

Some resources may be shared by the different groups. The bus master device 216, for example may be shared by both of the groups 110 and 130. The partition manager 102 programs configuration registers within the AIDA device 226 with the GID values for both groups 110 and 130. The group manager 112 programs configuration registers with GID=1 with DID values for establishing access mechanisms and control for the bus master device 216 when being operated by or within the group 110. Similarly, the group manager 132 programs configuration registers with GID=2 with DID values for establishing access mechanisms and control for the bus master device 216 when being operated by or within the group 130.

Figure 3:
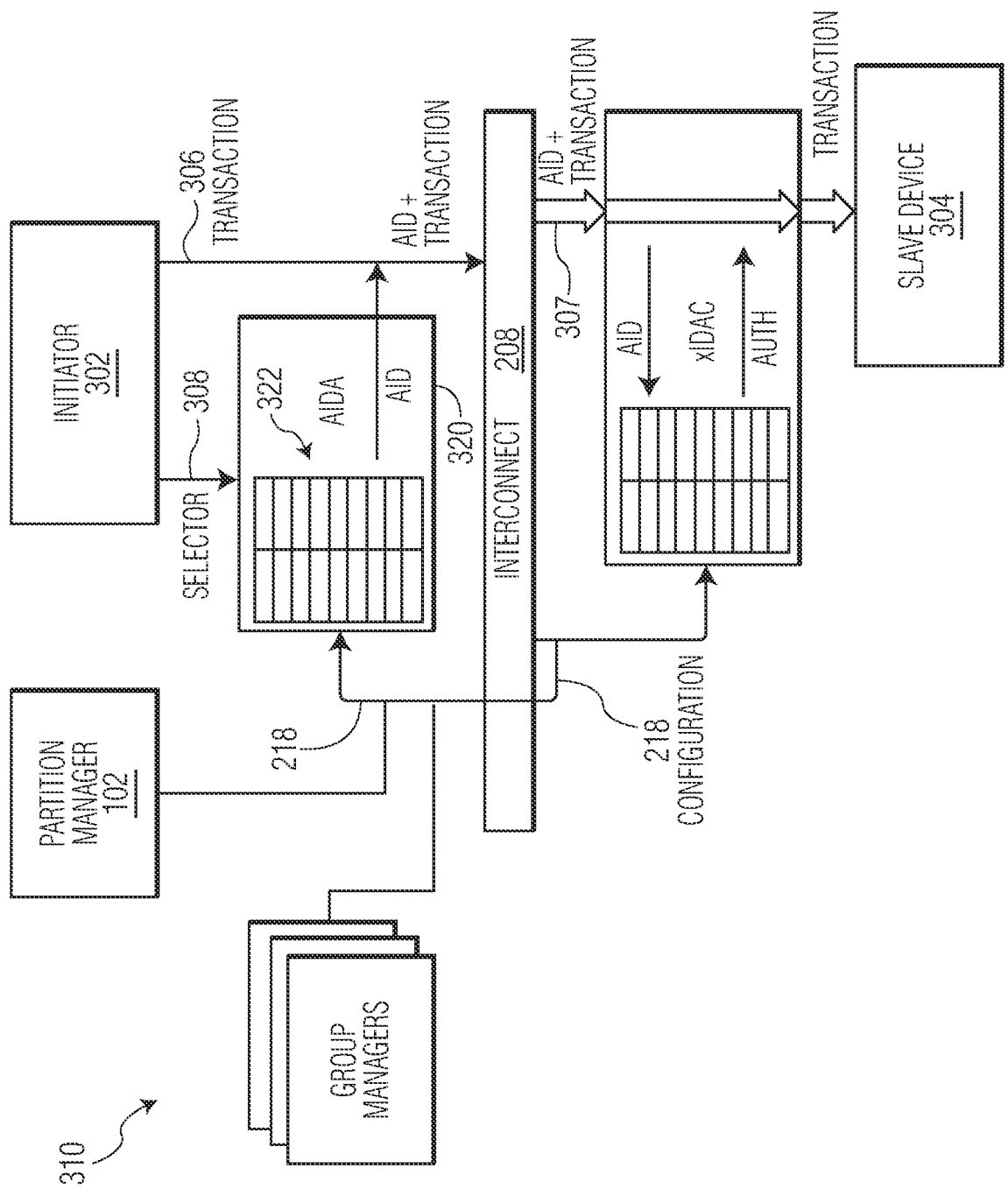
FIG. 3 is a simplified block diagram illustrating an exemplary access identifier assignment (AIDA) device, an exemplary firewall device (e.g., "xIDAC" device), and group managers implemented according to one embodiment for controlling access to a slave device by an initiator via an interconnect.

FIG. 3 is a simplified block diagram illustrating an exemplary AIDA device 320, an exemplary xIDAC device 330, and group managers 310 implemented according to one embodiment for controlling access to a slave device 304 by an initiator 302 via the interconnect 208. The AIDA device 320 and the xIDAC device 330 both include configuration registers programmed by the partition manager 102 to divide resources among multiple groups. The initiator 302 represents any of the initiators 202, which may include other initiator devices or accelerators, such as DMA or Ethernet controllers and the like that may conduct transactions via a bus 306 coupled to the interconnect 208 and accessible to the AIDA device 320. The slave device 304 is coupled to the interconnect 208 via a bus 307 with accessibility being controlled by the xIDAC device 330. The slave device 304 represents the memory 206 or any other memory (not shown) that may be included, or any of the peripherals 204 or other peripherals (not shown) that may be included in a given configuration including I/O devices and the like. The AIDA device 320 represents any of the AIDA devices 220-226 or any other AIDA device that may be included, and the xIDAC device 330 represents any of the SIDAC devices 230-232 or the RIDAC device 234 or any other xIDAC devices that may be included in a given configuration.

The AIDA device 320 includes a set of configuration registers 322 and the xIDAC device 330 includes a set of configuration registers 332. The partition manager 102 and the group managers 310 access the configuration registers 322 and 332 via the configuration bus 218 using their corresponding GID. The AIDA device 320 and the xIDAC device 330 check the AID of the applicable manager, such as according to values provided within their configuration registers, to determine whether the writer is the partition manager 102 or a designated group manager 310. The configuration registers 322 of the AIDA device 320 includes a group register portion for programming GIDs by the partition manager 102 and includes a domain register portion for programming DIDs by authorized ones of the group managers 310 as further described herein. The configuration registers 332 of the xIDAC device 330 includes a group register portion for programming GIDs, and, when applicable, global memory ranges and other permissions by the partition manager 102, and includes a domain register portion for programming DIDs, and, when applicable, memory segments and other values and permissions by authorized ones of the group managers 310 as further described herein. The GIDs written by the partition manager 102 in the configuration registers 322 and 332 enable authorized group managers to write into corresponding configuration registers in the domain register portions of the configuration registers 322 and 332 as further described herein.

In operation after the configuration registers of the AIDA device 320 and the xIDAC device 330 are programmed, the initiator 302 may assert a transaction on the bus 306 addressing the slave device 304 via the AIDA device 320. The initiator 302 also asserts a selector on an interface 308 in which the selector has any one of several different formats as further described herein. The interface 308 may be separately provided or the selector may be derived from information from the transaction as further described herein. The selector is applied to the configuration registers 322 of the AIDA device 320, which provides a corresponding AID. The AID is appended to the transaction on the bus 306 being asserted onto the interconnect 208. In one embodiment, the transaction on the bus 306 may include a field for receiving the AID from the AIDA device 322. In another embodiment the AID is asserted onto the bus 306 which is applied to a corresponding portion of the interconnect 208 by extension. In yet another embodiment, the AID may be asserted directly onto the interconnect 208 by the AIDA device 320.

The AID, along with other transaction information, is applied to the configuration registers 332 of the xIDAC device 330 from the interconnect 208 to determine whether the transaction is authorized to access the slave device 304. Authorization means whether the initiator 302 is authorized to access the slave device 304 and whether the transaction meets corresponding permissions as further described herein. If the transaction is authorized, then an authorization (AUTH) value is provided to allow the transaction to be applied to the slave device 304. If not allowed, then the transaction is denied and thus prevented from accessing the slave device 304. The AUTH value may be implemented in any suitable manner, such as configured to enable pass devices when authorized or to disable pass devices when not authorized.

Figure 4:
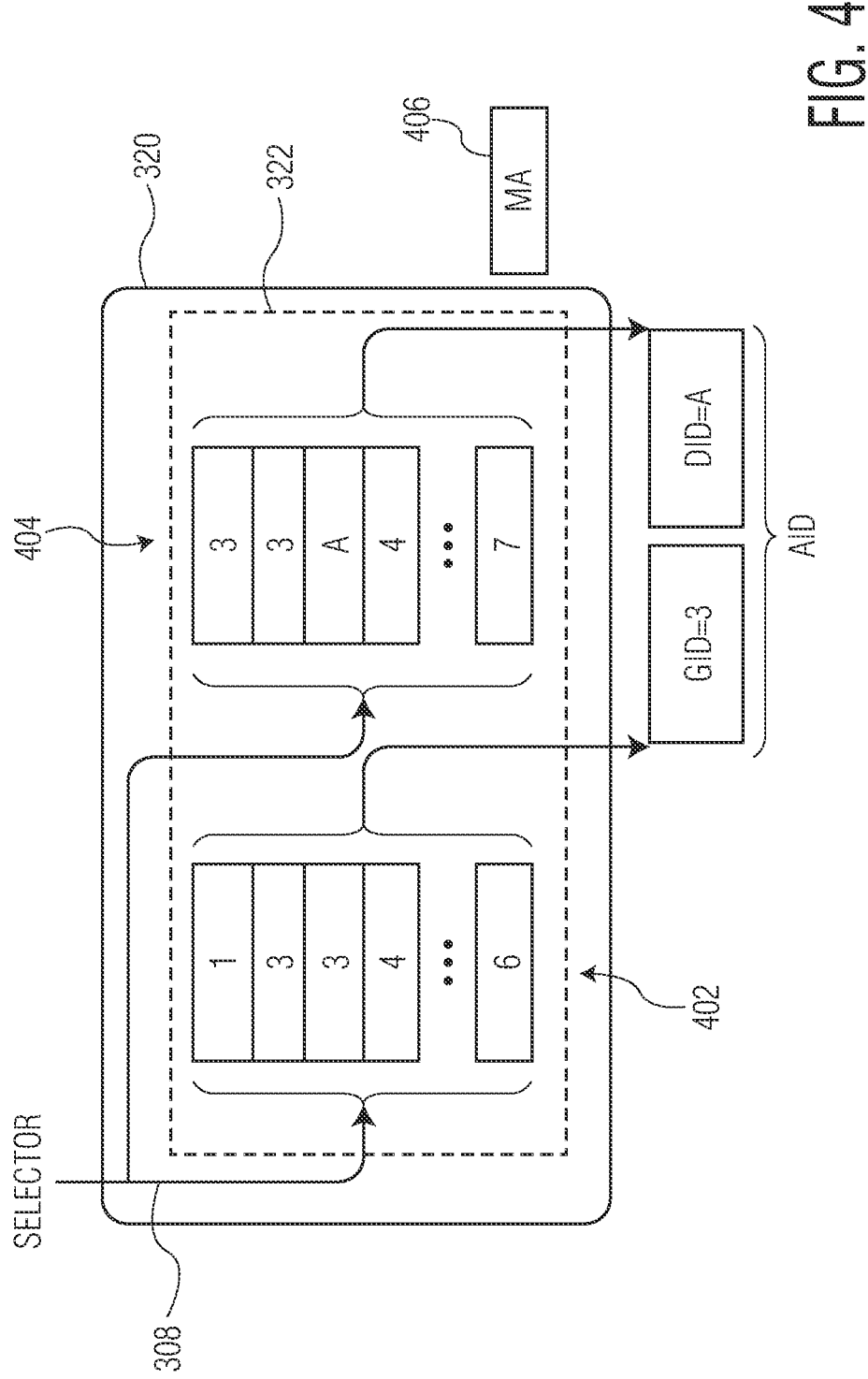
FIG. 4 is a simplified block diagram illustrating further details of the AIDA device of FIG. 3 implemented according to one embodiment.

FIG. 4 is a simplified block diagram illustrating further details of the AIDA device 320 implemented according to one embodiment. Again, the AIDA device 320 represents any of the AIDA devices 220-226 or any other AIDA that may be included in a given configuration. The AIDA device 320 has two levels of programming control, including a first level that enables the partition manager 102 to allocate isolation resources to various groups, and a second level that is used by one or more of the group managers 310 at the same time. The group manager that has been assigned an isolation resource may program that resource, which keeps the programming of one group isolated from the other groups. The partition manager 102 writes a GID value identifying the owner of each isolation resource, and only the group manager that owns that resource, meaning having the matching GID, may program that resource. Attempts by other group managers with different GID values are blocked or denied. Although two levels of programming are illustrated, the assignment of and AID for each slot may be done as one action.

In the illustrated configuration, the configuration registers 322 includes a set of group configuration registers 402 that are programmable with GID values only by the partition manager 102. The configuration registers 322 also includes a set of domain configuration registers 404 in which each domain configuration register corresponds with one of the group configuration registers 402. As illustrated, the individual registers of the group configuration registers 402 and the domain configuration registers 404 are aligned and organized as a set of rows or slots. Each domain configuration register may be programmed with a DID value only by the group manager 310 that owns the slot, meaning the group manager having a GID that matches the GID value of the corresponding group configuration register in the same slot. As shown, for example, the first or top domain configuration register may only be programmed by the group manager having GID=1, the next two domain configuration registers may only be programmed by the group manager having GID=3, and so on. If a group manager 310 attempts to write a DID into a slot that it does not own (meaning, its GID does not match the GID programmed into the corresponding group configuration register), then the write is denied. It is noted that several of the group managers 310 may set different DID values in slots that they own at different times.

During operation, the initiator 302 provides the selector on the interface 308 that identifies or otherwise addresses or selects one of the slots. The identified slot includes a group configuration register with a GID and a corresponding domain configuration register with a DID, in which the combination of GID and DID determines the AID. The selector allows the selection from among several different AIDs depending upon the circumstances, such as which OS or VM or SW application is running on a core, which channel of a DMA controller, etc. The selection process could be a direct index based on the selector, a mask and match, or ranges, etc. The AID is provided to the interconnect 208 to accompany a transaction, which includes the transaction information for accessing a resource.

The AIDA device 320 may include one or more modification alarm (MA) flags 406 that are triggered upon any changes to the configuration registers 322. As previously described, an MA flag may be configured to generate an interrupt to corresponding SAF/SEC managers which may then be executed to re-verify the configuration registers and other settings or conditions to determine whether any security or safety issues exist that need attention.

Figure 5:
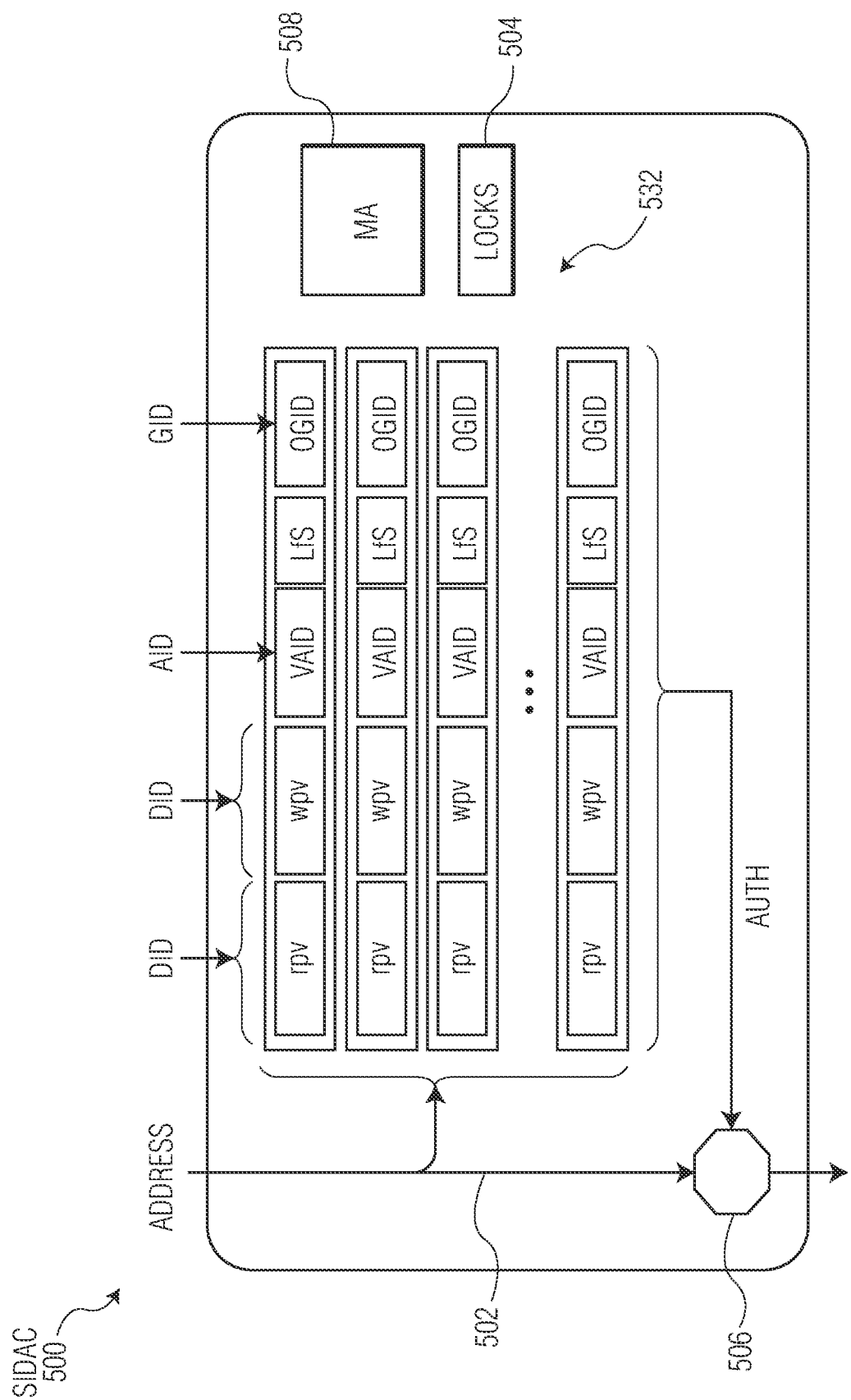
FIG. 5 is a simplified block diagram of a slot-based ID access control (SIDAC) device implemented according to one embodiment which may be used as either one or both of the SIDAC devices of FIG. 2 or any other SIDAC devices that may be included.

FIG. 5 is a simplified block diagram of a SIDAC device 500 implemented according to one embodiment which may be used as either one or both of the SIDAC devices 230 and 232 or any other SIDAC devices that may be included. The SIDAC device 500 includes a set of configuration registers 532 organized into one or more rows or slots each having multiple fields, in which each slot is used to control access to a corresponding one of multiple peripherals via a bus 502 interfacing the interconnect 208. The bus 502 is an implementation of the bus 307 for the SIDAC device 500 which carries the transaction an AID as previously described. It is noted that each slot may be implemented as a single register with multiple fields or as multiple registers each having one or more fields. The fields in the illustrated embodiment include a read permission vector (RPV) field, a write permission vector (WPV) field, a visitor AID (VAID) field, a lock for security (LFS) field, and an owner GID (OGID) field. The illustrated fields are exemplary in which it is understood that additional fields may be included in other embodiments.

Upon POR, the OGID field along with the RPV and WPV fields for each of the slots of the configuration registers 532 are set to zero, which is a no accessibility value that disables access by any of the group managers so that only the partition manager 102 has access. Also, if a group is reset, then the OGID field identifying the group manager is reset to zero. After reset, the OGID field is written by the partition manager 102 with a GID to identify the group manager that owns the slot and thus controls access to the corresponding peripheral. Writing a non-zero value into the OGID field changes ownership of the slot from the partition manager 102 to the identified group manager. In addition, writing a non-zero value to the OGID field of a slot changes the RPV and WPV fields, which comprise bit vectors, to all 1s to enable full accessibility to the group manager that owns the slot.

Only the group manager with a GID matching the GID stored into the OGID field of a given slot of the configuration registers 532 that owns the slot is authorized to write into any of the remaining fields of that slot. The RPV field is a bit vector of DIDs with read permissions for the corresponding peripheral. The WPV field is a bit vector of DIDs with write permissions for the corresponding peripheral. In particular, each of the DIDs of the group that owns a slot as determined by the GID written into the OGID field is mapped to a corresponding bit of the read and write vectors in which the mapped bit value (e.g., logic "0" or logic "1") indicates whether the corresponding permission is allowed or denied for that DID. For example, bit "2" may be mapped to DID=2 in which bit 2 may be logic "0" to deny access or may be logic "1" to allow access when DID=2. The VAID field stores an AID value (GID.DID) which allows the authorized group manager to define read or write permissions for transactions providing an AID that matches the AID stored in the VAID field with a GID that does not match the GID stored in the corresponding OGID field. In this context, a "visitor" refers to an initiator providing a GID that does not match the GID in the OGID for that slot, but that nonetheless may be allowed to conduct transactions that access the corresponding slave device. Each of the RPV and WPV fields may include an additional bit that corresponds with a visitor initiator having an AID that matches the AID stored into the VAID field. The LFS field may be set by the authorized group manager to lock the RPV, WPV and VAID fields of the slot after being written (and before being locked by the partition manager 102).

A set of locks 504 is provided that can only be written by the partition manager 102. The locks 504 may be configured as a bitmap or the like including a lock bit or the like for each of the slots of the configuration registers 532. After writing a GID value into the OGID field of a given slot, only the group manager with a GID matching the GID programmed into the OGID field may program the other fields in that slot. After the group manager programs the fields of a slot for which it is authorized, it informs the partition manager 102 to write to the locks 504 to lock that slot. Once a slot is locked, all the fields of that slot are locked and cannot be modified by any entity including the authorized group manager. After each of the defined group managers have completed programming of corresponding slots of the configuration registers 532, the partition manager 102 may lock the entire set of configuration registers 532 including any unused slots. Thereafter, the configuration registers 532 remain locked until next POR.

In operation, a slot of the configuration registers 532 and the corresponding peripheral are addressable by a transaction address ADDRESS that is provided as part of a transaction asserted on the bus 502 via the interconnect 208. An initiator 202 (e.g., initiator 302) attempting access to the peripheral (e.g., slave device 304) asserts a corresponding ADDRESS, in which an AID=GID.DID appended to the transaction is applied to corresponding fields of the addressed slot. The transaction GID is compared with the corresponding OGID value of the addressed slot. Assuming GID matches OGID, the bit value of the read permission vector RPV mapped to the transaction DID determines whether a read transaction is authorized. In a similar manner, assuming GID matches OGID, the bit value of the write permission vector WPV mapped to the transaction DID determines whether a write transaction is authorized. Even when the GID does not match the OGID, the transaction may be authorized if the transaction AID matches the AID value stored in the VAID field and the corresponding bit in either the RPV field or the WPV field provides authorization for a read transaction, a write transaction, or both. When any transaction is authorized, the AUTH value is asserted. A transaction blocking circuit 506 blocks the bus 506 or otherwise prevents access to the peripheral for the transaction unless the AUTH value is asserted.

The SIDAC device 500 may include one or more MA flags 508 that are triggered upon any changes to the configuration registers 532. As previously described, an MA flag may be configured to generate an interrupt to corresponding SAF/SEC managers which may then be executed to re-verify the configuration registers and other settings or conditions to determine whether any security or safety issues exist that need attention.

Figure 6:
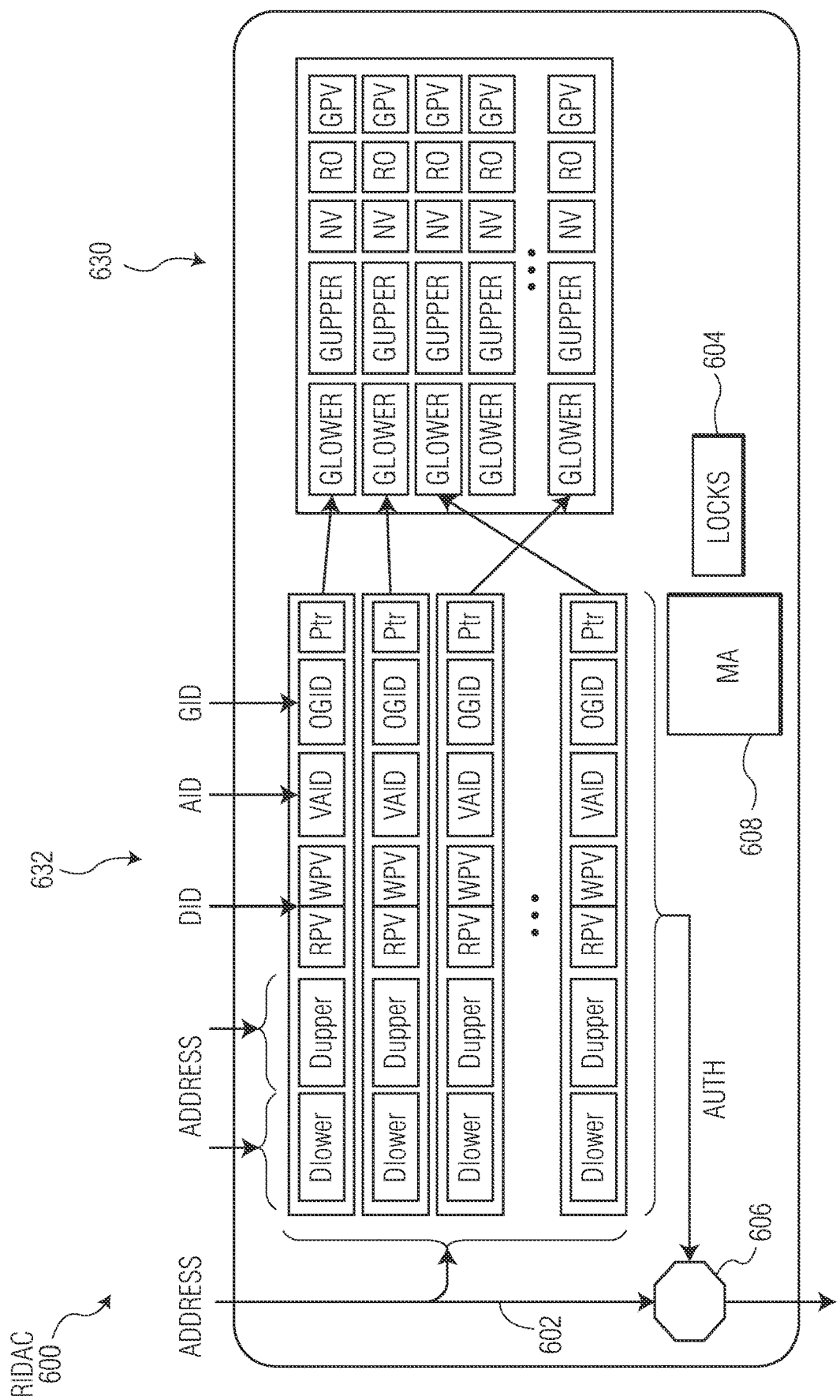
FIG. 6 is a simplified block diagram of a range-based ID access control (RIDAC) device implemented according to one embodiment which may be used as the RIDAC device of FIG. 2 or any other RIDACs that may be included.

FIG. 6 is a simplified block diagram of a RIDAC device 600 implemented according to one embodiment which may be used as the RIDAC device 234 or any other RIDACs that may be included. The RIDAC device 600 includes a first set of configuration registers 630 and a second set of configuration registers 632. Each set of configuration registers 630 and 632 is organized into one or more rows or slots each having multiple fields, in which each slot is used to control access to an identified range or segment of the memory 206 via a bus 602 interfacing the interconnect 208. The bus 602 is an implementation of the bus 307 for the RIDAC device 600 which carries the transaction information as previously described. A corresponding AID may be incorporated within the transaction or provided directly from the interconnect 208. It is noted that each slot of each register set may be implemented as a single register with multiple fields or as multiple registers each having one or more fields.

The configuration registers 630 are programmed only by partition manager 102 to define a list of global memory ranges and corresponding permissions for one or more identified groups. GLOWER and GUPPER fields store lower and upper address values, respectively, specifying a global memory range. A no VAID (NV) field is at least one bit that indicates whether to allow or disallow visitors to the specified global memory range even when the visitor has an AID that matches the AID programmed into a VAID field. A read-only (RO) field specifies whether or not the global memory range is read-only. A group permission vector (GPV) field is a bit vector that defines access permissions for each of the GIDs for the corresponding global memory range. In particular, the GIDs are each mapped to a corresponding bit of the GPV in which the mapped bit value (e.g., logic "0" or logic "1") indicates whether or not the corresponding group has access to the global memory range. For example, bit "4" may be mapped to GID=4 in which bit 4 may be logic "0" to deny access by the group 4 (with GID=4), or may be logic "1" to allow access by the group 4.

The configuration registers 632 include an OGID field that operates in a similar manner as the OGID field of the configuration registers 532. Initially, the OGID field is reset to 0 so that the partition manager 102 is manager and only the partition manager 102 is provided access. The partition manager 102 writes the OGID field with a GID value to re-assign the slot to a group identified by the GID value. A group is authorized to use any slot having an OGID programmed with a matching GID. The authorized group manager of a slot of the configuration registers 632 may program a pointer (PTR) field to point to any one of the slots of the configuration registers 630 in which the GPV allows access. In other words, the bit of the GPV corresponding to the GID programmed into OGID must be set to allow access. The authorized group manager of a slot of the configuration registers 632 writes lower and upper addresses into DLOWER and DUPPER fields, respectively, to specify a memory segment controlled by that slot. The memory segment defined by the DLOWER and DUPPER fields, however, must be completely contained within the global memory range defined by the GLOWER and GUPPER fields of the slot of the configuration registers pointed to by PTR. The memory segment defined by the DLOWER and DUPPER fields can be any subrange up to the entire global memory range defined by the GLOWER and GUPPER fields, but cannot include any memory addresses outside the global memory range. A write to the DLOWER and DUPPER fields to specify a memory segment is denied if the memory segment is not completely contained within the global memory range defined by the corresponding GLOWER and GUPPER fields of the slot pointed to by PTR.

In a similar manner as the configuration registers 532, the configuration registers 632 include an RPV field which is a bit vector of DIDs with read permissions for the corresponding memory segment defined by the DLOWER and DUPPER fields of the corresponding slot. Also the configuration registers 632 include a WPV field which is a bit vector of DIDs with write permissions for the corresponding memory segment defined by the DLOWER and DUPPER fields of the corresponding slot. In particular, each of the DIDs of the group that owns a slot of the configuration registers 632 as indicated by OGID is mapped to a corresponding bit of the read and write vectors in which the mapped bit value (e.g., logic "0" or logic "1") indicates whether the corresponding permission is allowed or denied for that DID. Alternative embodiments are contemplated. In general, one or more fields may be included to establish read and write access policies that can be set for each DID. The RPV and WPV fields of the configuration registers 632 operate in a similar manner as described for the configuration registers 532 as controlled by the corresponding OGID field.

The configuration registers 632 include a visitor AID (VAID) field which stores an AID value (GID.DID) that allows the authorized group manager to define read and write permissions for a visitor initiator with a matching AID. Each of the RPV and WPV fields may include an additional bit that corresponds with a visitor initiator having an AID that matches the AID stored into the VAID field.

A set of locks 604 is provided that can only be written by the partition manager 102. The locks 604 may be configured in a similar manner as the locks 504 and may be configured as a bitmap or the like including a lock bit or the like for each of the slots of the configuration registers 632. After writing a GID value into the OGID field of a given slot, only the group manager with a GID matching the GID programmed into the OGID field may program the other fields in that slot. After the group manager programs the fields of a slot for which it is authorized, it informs the partition manager 102 to write to the locks 604 to lock that slot. Once a slot is locked, all the fields of that slot are locked and cannot be modified by any entity including the authorized group manager. After each of the defined group managers have completed programming of corresponding slots of the configuration registers 632, the partition manager 102 may lock the entire set of configuration registers 632 including any unused slots. Thereafter, the configuration registers 632 remain locked until next POR.

In operation, the slots of the configuration registers 632 and the corresponding memory segments are addressable by a transaction address ADDRESS that is provided as part of a transaction asserted by an initiator on the bus 602 via the interconnect 208. An AID=GID.DID appended to the transaction is simultaneously applied with the corresponding ADDRESS to corresponding fields of each of the memory access rules of each of the slots of the configuration registers 632. ADDRESS is compared to each of the memory segments specified by DLOWER and DUPPER, GID is compared with each OGID value, DID is applied to both read and write vectors in the RPV and WPV fields, and AID is compared with each AID value in each VAID field simultaneously. It is possible that multiple matches and may occur in which a priority order may be employed, such as the first slot having matching values. When a match is found and the corresponding transaction is authorized, the AUTH value is asserted. A transaction blocking circuit 606 blocks the bus 606 or otherwise prevents access to the memory (or other resource) for the transaction unless the AUTH value is asserted.

The RIDAC device 600 may include one or more MA flags 608 that are triggered upon any changes to the configuration registers 630 or 632. As previously described, an MA flag may be configured to generate an interrupt to corresponding SAF/SEC managers which may then be executed to re-verify the configuration registers and other settings or conditions to determine whether any security or safety issues exist that need attention.

An initiator 202 implemented as a core may be exclusively used by one group, or may be shared in which it performs actions for multiple groups. A DMA controller with multiple channels may be a shared initiator or bus master in which different channels of the DMA controller may be allocated for use different groups. The AIDA selector for selecting the AID for a transaction by the DMA controller may be the DMA channel number. A security engine with multiple job rings may be shared in which different job rings may be allocated for use by different groups. Each job ring may have different security keys available to it. The AIDA selector for selecting the AID for a transaction by the security engine may be the job ring identifier. An I/O peripheral may be shared in which the I/O traffic may be separated into multiple channels in which each channel is intended to be directed towards a particular group. As an example, an Ethernet message of an Ethernet controller may be separated by port number, Internet Protocol (IP) value, media-access control (MAC) address, a virtual private network (VPN) channel, etc. The AIDA selector may be an ID based on the channel. A core may be shared in which it performs services for multiple groups. The AIDA selector may be a task ID, a VM ID, an elevation level (e.g., security, privilege), a time-division multiplexing (TDM) ID, etc. Software executing on the core may explicitly set the ID used for the selector, or hardware could change the selector and then invoke change on the core through a threading swap or interrupt or the like.

Figure 7:
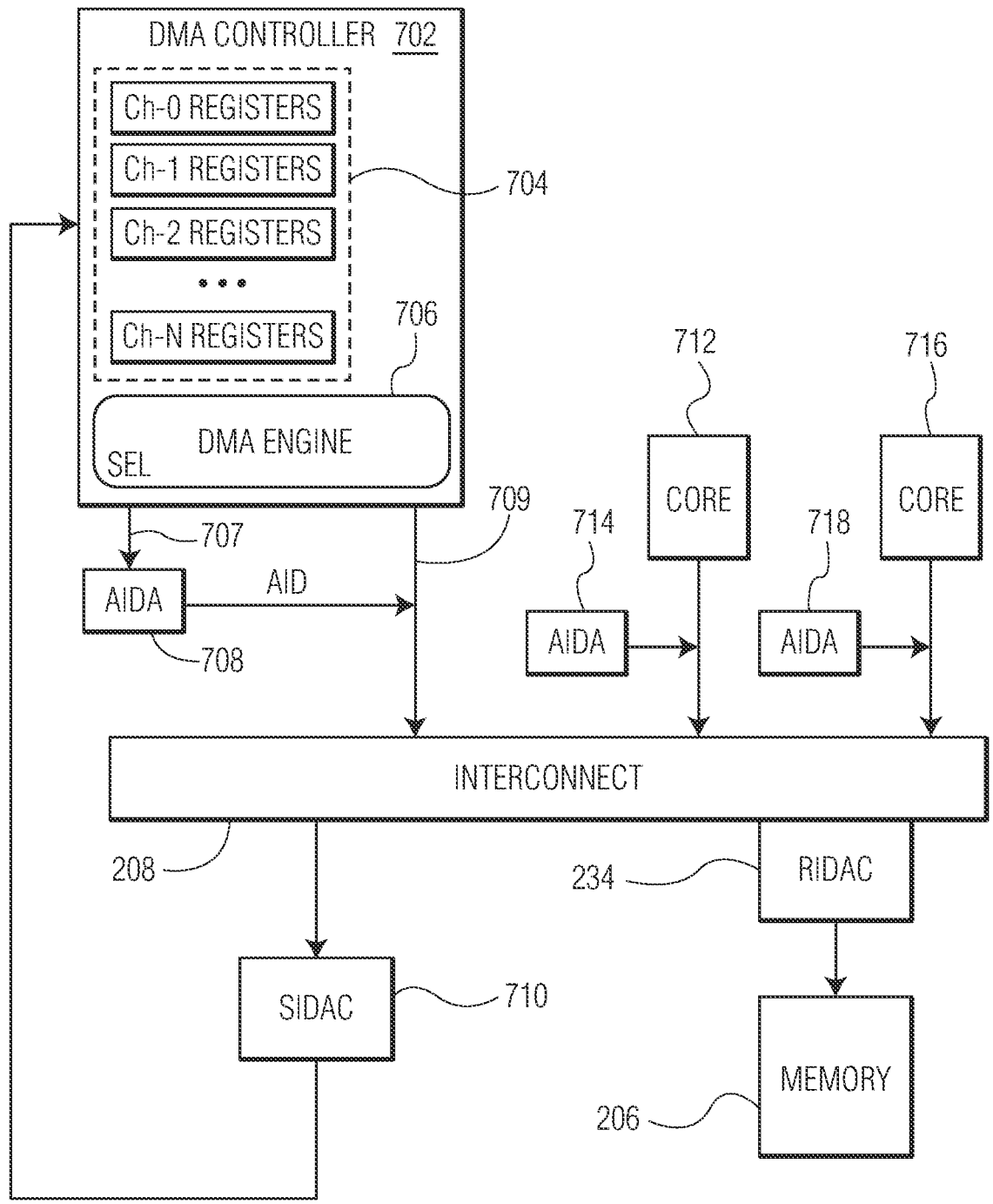
FIG. 7 is a block diagram illustrating one of the initiators of FIG. 2 of the IC of FIG. 1 configured as a direct memory access (DMA) controller according to one embodiment.

FIG. 7 is a block diagram illustrating one of the initiators 202 of the IC 100 configured as a DMA controller 702 according to one embodiment. The DMA controller 702 interfaces the interconnect 208 with transactions supplemented by an AIDA device 708, which may be configured in the same or similar manner as the AIDA device 320. The DMA controller 702 includes multiple memory-mapped DMA channels 704 and a DMA engine 706. The DMA engine 706 provides a selector (SEL) on an interface 707 to the AIDA device 708 in which SEL may be a DMA channel number. The DMA engine 706 conducts memory transfer transactions via a bus 709 coupled to the interconnect 208 which may be accessible to the AIDA device 708. Although not shown, the DMA controller 702 includes memory or buffer or the like for temporarily storing data being transferred from one memory location to another during a DMA transaction. A round-robin or other priority scheme may be used to allow the DMA channels 704 to use a common movement engine.

Each of the DMA channels 704 may have an independent bank of DMA channel control registers, in which the DMA channel control registers may be located in the memory-map at fixed intervals. The DMA channel control registers may be used to define control parameters for DMA transfer operations, such as, for example, source and destination addresses, message length, etc. A SIDAC device 710 is coupled to the interconnect 208 and programmed to control access to the DMA channels 704. In this manner, although the DMA channels 704 are located within the DMA controller 702, the SIDAC device 710 facilitates access control of the DMA channel control registers.

The memory 206 is shown coupled to the interconnect 208 via the RIDAC device 234. The initiators 202 include a first core 712 interfacing the interconnect 208 via an AIDA device 714 and a second core 716 interfacing the interconnect 208 via another AIDA device 718. The cores 712 and 716 may be configured to operate in the same or different groups. In one embodiment, the cores 712 and 716 are both assigned to group 1. The SIDAC device 710 may be programmed to enable the cores 712 and 716 to access selected ones of the DMA channels 704 for programming the corresponding DMA channel control registers. The AIDA device 320 and the RIDAC device 234 are programmed to enable the DMA engine 706 to access selected segments of the memory 206. The DMA engine 706 may use the DMA channel number as SEL to select the AID including a GID and a DID. The AIDA device 320 may be programmed to allow each of the DMA channels 704 to act with the same or a different AID. In this manner, the DMA controller 702 may be shared among multiple groups. In particular, each memory range corresponding to the DMA channel control registers of each of the DMA channels 704 can allow access for different groups and different domains of each group.

As an example of sharing, the partition manager 102 programs a slot of the configuration registers of the SIDAC device 710 to guard the DMA channel 5 registers to GID=1. A group manager for group 1 programs the configuration registers of the SIDAC device 710 for the same slot for DMA channel 5 to allow read and write for access for transactions with DID=4. If the AIDA device 714 enables the core 712 to operate with AID=1.4 (GID=1, DID=4), then the core 712 using AID=1.4 can program the DMA channel control registers of channel 5. The partition manager 102 also sets GID=1 for slot 5 in the AIDA device 708, and the group manager for group 1 sets DID=9 for slot 5 in the AIDA device 708. In addition, the RIDAC device 234 is programmed by the partition manager 102 and the group manager for group 1 to allow access to a memory segment of the memory 206 to AID=1.9. The DMA engine 706 may use DMA channel 5 to perform a DMA transaction within the memory segment of the memory 206 that allows AID=1.9. In this manner, software operating with AID=1.4 can perform DMA transactions into the memory 206 that it might not otherwise have direct access to, namely transactions using AID=1.9. It is noted, however, that the AIDA device 708 may alternatively be programmed to enable access for AID=1.4.

As another example of sharing, the AIDA device 718 and the SIDAC device 710 may be programmed to allow the core 716 to program the DMA channel 6 registers. In addition, the AIDA device 708 and the RIDAC device 234 may be programmed to enable the DMA engine 706 to perform a DMA transaction in a segment of the memory 206 using AID=2.8. In this manner, a DMA transaction may be programmed by a first group and performed by a second group. Such capability is useful, for example, when one group is providing service for another group. The DMA transaction effectively joins the other group for the DMA transaction. The group manager for group 1 was able to choose the DID used for programming the channel 6 registers via the SIDAC device 710. The group manager for group 2 was able to choose the DID used for the DMA channel 6 transactions in the AIDA device 708, so that group 2 is able to control the DID used and the memory segments that can be reached.

Figure 8:
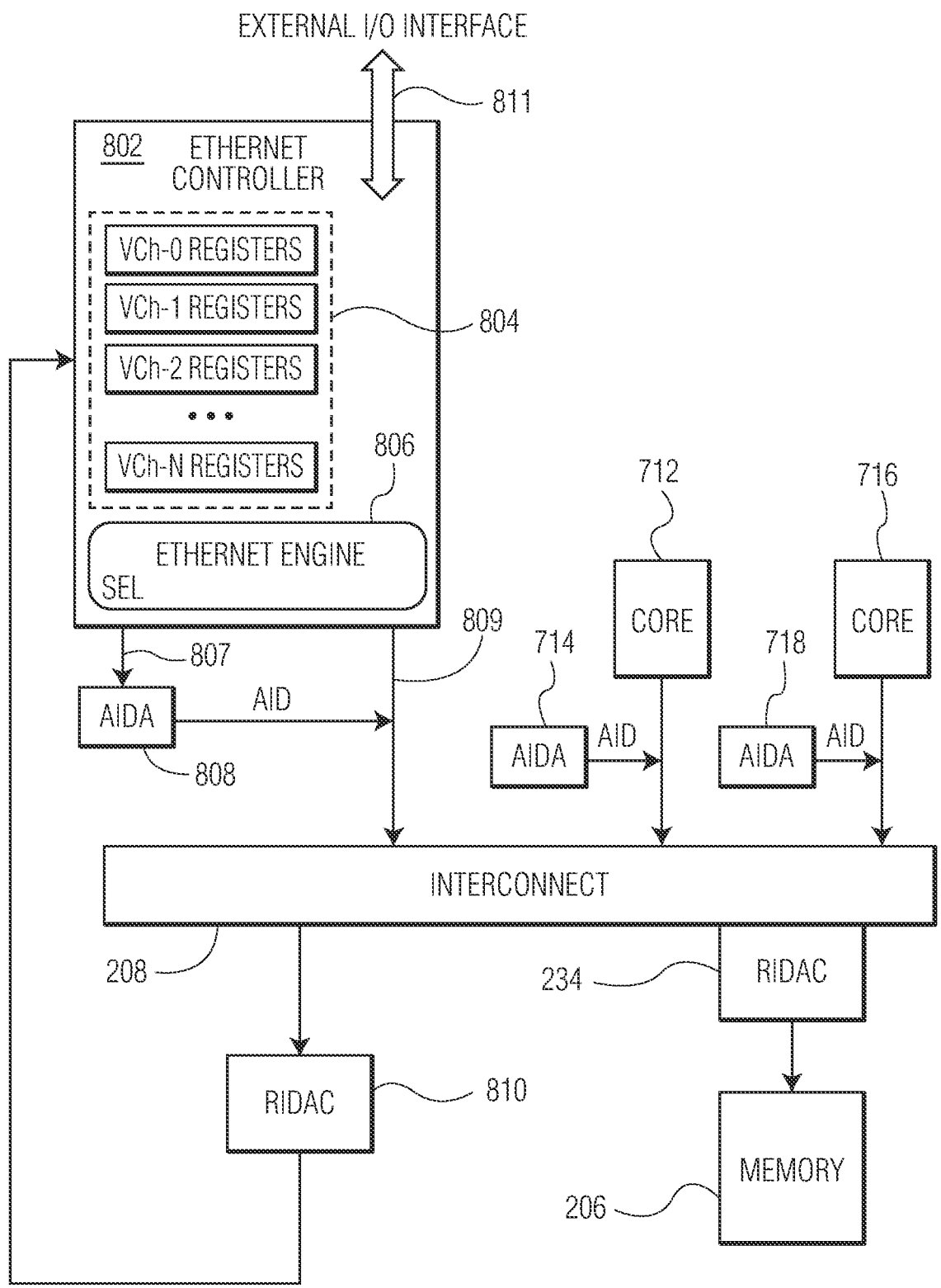
FIG. 8 is a block diagram illustrating one of the initiators of FIG. 2 of the IC of FIG. 1 configured as an Ethernet controller according to one embodiment.

FIG. 8 is a block diagram illustrating one of the initiators 202 of the IC 100 configured as an Ethernet controller 802 according to one embodiment. The Ethernet controller 802 interfaces the interconnect 208 with transactions being supplemented by an AIDA device 808, which may be configured in the same or similar manner as the AIDA device 320. The Ethernet controller 802 includes multiple memory-mapped Ethernet virtual channels 804 and an Ethernet engine 806. Each of the Ethernet virtual channels 804 may have an independent bank of Ethernet channel control registers. The Ethernet controller 802 provides a selector (SEL) on an interface 807 to the AIDA device 808 in which SEL may be a virtual channel number. The Ethernet engine 806 accesses internal resources via a bus 809 coupled to the interconnect 208 which is accessible to the AIDA device 808. The Ethernet controller 802 includes an external I/O interface 811 for sending and receiving data via external devices (not shown). Although not shown, the Ethernet controller 802 includes memory or buffer or the like for temporarily storing data being transferred between internal and external locations.

Some I/O interfaces, including the Ethernet controller 802, can carry multiple streams of data. A SIDAC may aid in combining and separating different data streams based on part of the I/O data. For some peripherals, the control registers for a virtual channel may not be all grouped together in regular intervals suitable for a SIDAC. Instead, a RIDAC device 810 is coupled to the interconnect 208 and programmed to control access to the Ethernet channels 804. In a similar manner as described for the DMA controller 702, although the Ethernet channels 804 are located within the Ethernet controller 802, the RIDAC device 810 facilitates access control of the Ethernet channel registers. A virtual channel number of the Ethernet virtual channels 804 may be used as the selector to the AIDA device 808.

The memory 206 is shown coupled to the interconnect 208 via the RIDAC device 234. The initiators 202 include the first core 712 interfacing the interconnect 208 via the AIDA device 714 and the second core 716 interfacing the interconnect 208 via the other AIDA device 718. The cores 712 and 716 may be configured to operate in the same or different groups. Flexibility of operation is similar to that shown and described for the DMA controller 702. For data received via the external I/O interface 811, the virtual channel is determined by inspecting fields of the incoming data stream. For outgoing data, different control registers may be used by each user, and that sets the virtual channel to the AIDA device 808. It is noted that data streams may be separated or combined according to some part of the data stream, such as port number, virtual port number, IP, MAC, etc.

Figure 9:
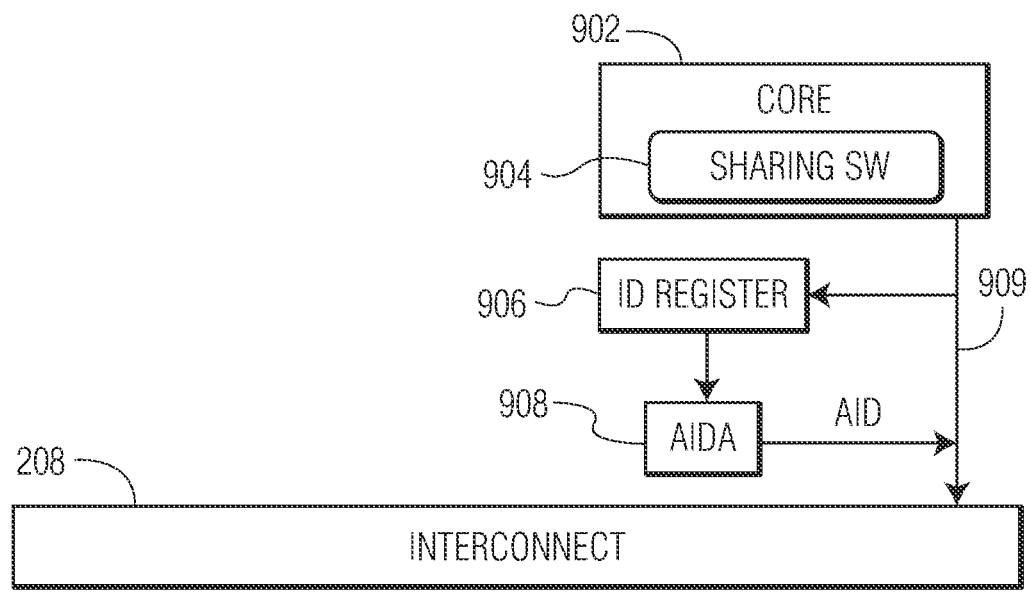
FIG. 9 is a block diagram illustrating a first method of sharing a core among multiple groups according to one embodiment.

FIG. 9 is a block diagram illustrating a first method of sharing a core 902 among multiple groups according to one embodiment. The core 902 is an example of one of the initiators 202 configured as a processing core or the like. Cores may be used by only one group. In many cases, however, a core may be shared among groups running software for multiple groups. A core 902 is interfaced to the interconnect 208 with transactions supplemented by an AIDA device 908. The core 902 accesses resources via a bus 909 coupled to the interconnect 208 which is accessible to the AIDA device 908. The core 902 illustrates a first sharing example in which it executes sharing software 904 comprising a single piece of software performing services for multiple groups and domains. In this case, the selector can be a sourced from an ID register 906 external to the core 902 that is set by the sharing software 904 via the bus 909.

Figure 10:
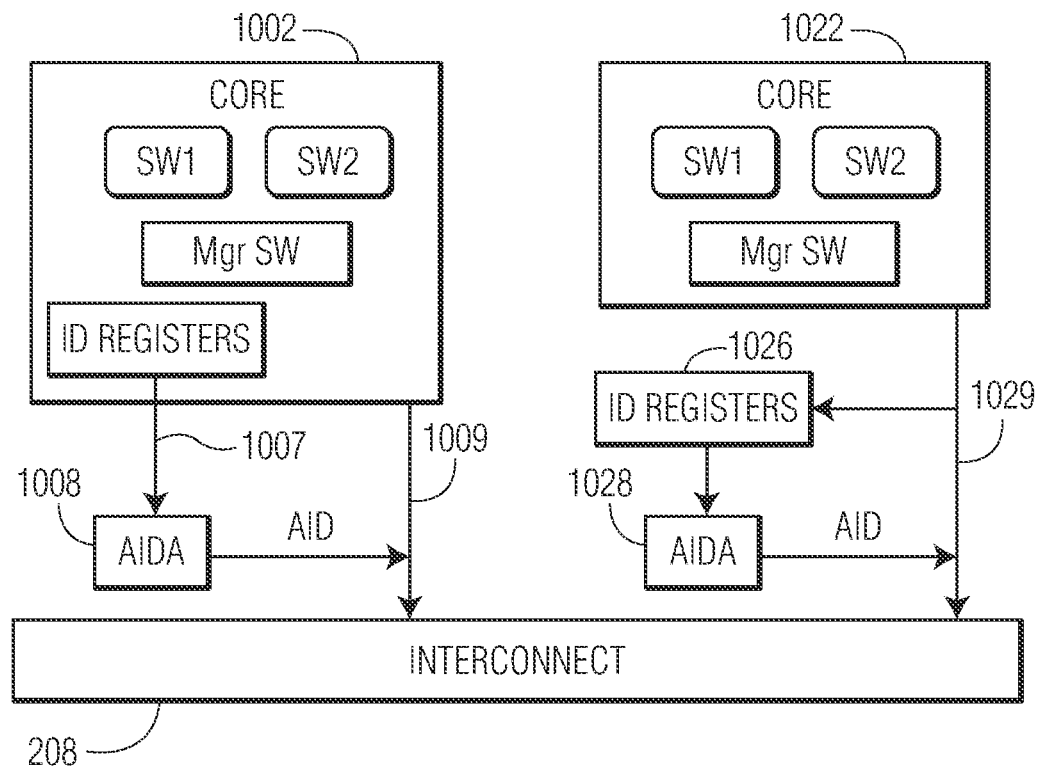
FIG. 10 is a block diagram illustrating a second method of sharing cores among multiple groups according to one embodiment.

FIG. 10 is a block diagram illustrating a second method of sharing a core 1002 or a core 1022 among multiple groups according to one embodiment. The cores 1002 and 1022 are examples of the initiators 202 configured as processing cores or the like. The first core 1002 is interfaced to the interconnect 208 with transactions supplemented by an AIDA device 908. The core 1002 accesses resources via a bus 1009 coupled to the interconnect 208 with transactions that are accessible to the AIDA device 1008. A software manager (MGR SW) switches between software of several groups, shown as SW1 and SW2, and sets an ID register 1006. In this case, the ID register 1006 is internal to the core 1002 and provides the selector via an interface 1007. In this case, the ID register 1006 is internal to the core 1002 and provides the selector via an interface 1007.

Similarly, the second core 1022 is interfaced to the interconnect 208 with transactions supplemented by an AIDA device 1028. The core 1022 accesses resources via a bus 1029 coupled to the interconnect 208 with transactions that are accessible to the AIDA device 1028. In a similar manner, a software manager (MGR SW) switches between software of several groups, shown as SW1 and SW2, and sets an ID register 1026. In this case, the ID register 1006 is external to the core 1022 and is set by software via the bus 1029, similar to that shown in FIG. 9. The ID register 1006 provides the selector to the AIDA device 1028 to accompany transactions via the bus 1029 generated by the core 1022. The AIDA selector for either or both cores 1002 and 1022 can be a sourced from a core task ID, virtual machine ID, thread ID, elevation level (security, privilege), or a combination of any of those or other IDs.

Figure 11:
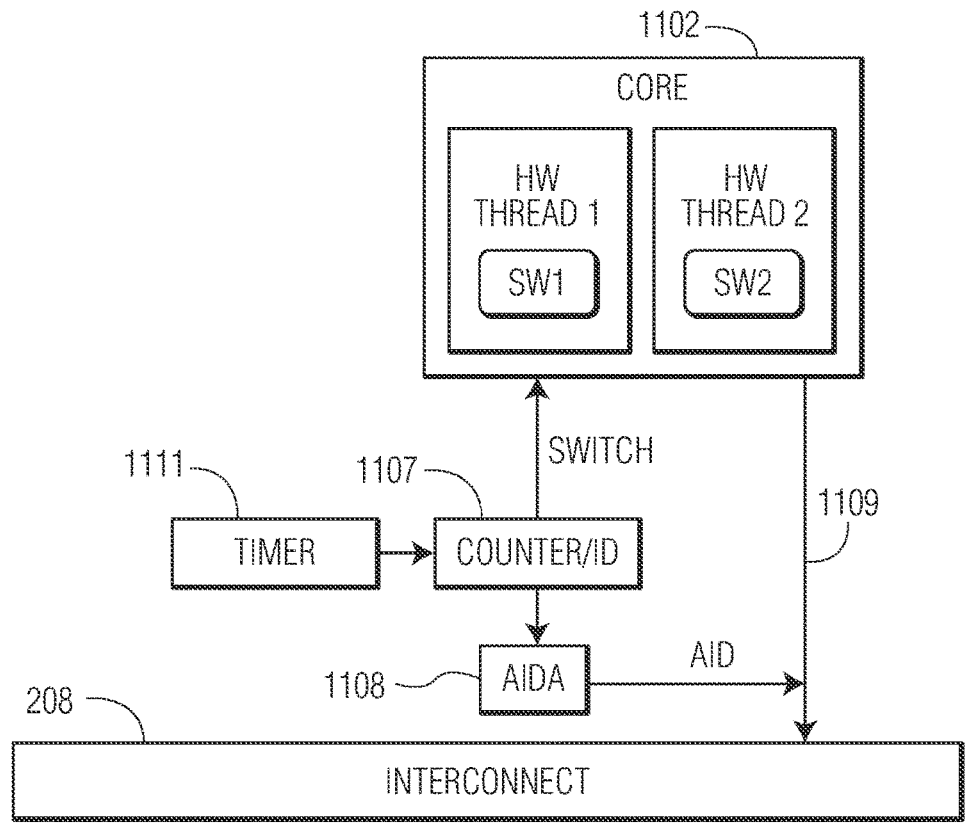
FIG. 11 is a block diagram illustrating a third method of sharing a core among multiple groups using time-division multiplexing according to one embodiment.

FIG. 11 is a block diagram illustrating a third method of sharing a core among multiple groups using time-division multiplexing according to one embodiment. The core 1102 is another example of one of the initiators 202 configured as a processing core or the like. A core 1102 is interfaced to the interconnect 208 with transactions supplemented by an AIDA device 1108. The core 1102 accesses resources via a bus 1109 coupled to the interconnect 208 with transactions that are accessible to the AIDA device 1108. In this case, rather than having software on the core to determine when to switch between executing software for multiple groups as shown in FIGS. 9 and 10, FIG. 11 illustrates that a hardware mechanism can be used. The core 1102 operates hardware threads 1 and 2, each executing corresponding software SW1 and SW2, respectively. Although only two hardware threads are shown, any number of threads may be included. A timer 1111 is programmed with a value indicative of an amount of time or number of clock cycles for executing each of the hardware threads. A counter 1107 provides a switch indication to the core 1102 for switching from one hardware thread to the next, and provides a corresponding selector value to the AIDA device 1108. In one embodiment, for example, the counter value identifies the hardware thread number in operation and also serves as the selector. When the timer 1111 times out such that the current period elapses for a given hardware thread, the timer 1111 provides an indication to increment the counter 1107, the next hardware thread is chosen for execution.

In operation, the timer 1111 is loaded with a timing value and the counter 1107 is loaded within an initial hardware thread number, and operation is initiated. The hardware thread corresponding with the initial count value begins execution and the timer 1111 is started. Upon timeout, the counter 1107 is incremented, the current hardware thread is suspended and the next hardware thread is initiated or otherwise resumes operation, and the count is provided as the selector to select the next slot within the AIDA device 208 that corresponds with the next hardware thread. The counter 1107 rolls over during operation so that the hardware threads are executed in round-robin fashion. In yet another alternative for use with cores without hardware threading, an interrupt is triggered causing managing software to switch between group software, which then switches the selector accordingly.

Figure 12:
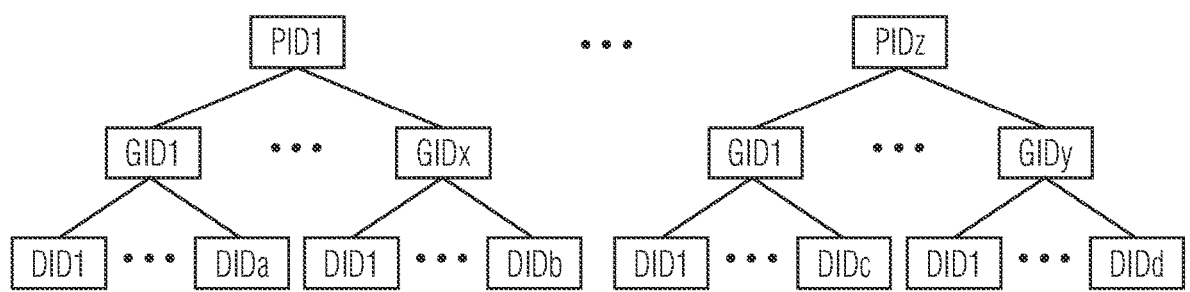
FIG. 12 is a simplified block diagram illustrating that the multiple level System-on-a-Chip (SoC) resource allocation and isolation system and method as described herein has a hierarchical structure that may be expanded to any suitable number of hierarchical levels.

FIG. 12 is a simplified block diagram illustrating that the multiple level SoC resource allocation and isolation system and method as described herein has a hierarchical structure that may be expanded to any suitable number of hierarchical levels. As previously described, any number of groups may be defined identified with corresponding GIDs, such as GID1, . . . , GIDx for a number "x" groups. Each of these groups GID1-GIDx may include any number of DIDs, such as DID1, . . . , DIDa for the first group GID1 and so on up to DID1, . . . , DIDb for the last group GIDx. The hierarchical structure may be expanded to include multiple partitions each with a corresponding partition identifier (PID), such as PID1, . . . , PIDz, in which each partition includes any suitable number of groups. As shown, for example, the first partition PID1 includes the groups GID1-GIDx, and any number of additional partitions may be defined up to a last partition PIDz, which includes another set of groups GID1-GIDy. Each of these groups GID1-GIDy of the last partition PIDz may include any number of DIDs, such as DID1, . . . , DIDc for the first group GID1 and so on up to DID1, . . . , DIDd for the last group GIDy. It is understood that any number of intermediate partitions may be defined between PID1 and PIDz (included zero in which z is 2), in which each additional partition includes any number of groups each with any suitable number of DIDs.

Although not specifically shown in FIG. 12, it is understood that additional hierarchical layers may be included, such as multiple system level tiers each with a corresponding system identifier (SID), in which each SID includes one or more PIDs, and so on. Although not specifically shown, the configuration registers 322, 332, and 532, 630, and 632 previously described may be expanded or additional configuration registers may be included to support an expansion of the hierarchical structure to include additional partitions as shown in FIG. 12, and to include any additional layers (e.g., system level tiers and so on) to facilitate isolation and control of the resources.

Figure 13:
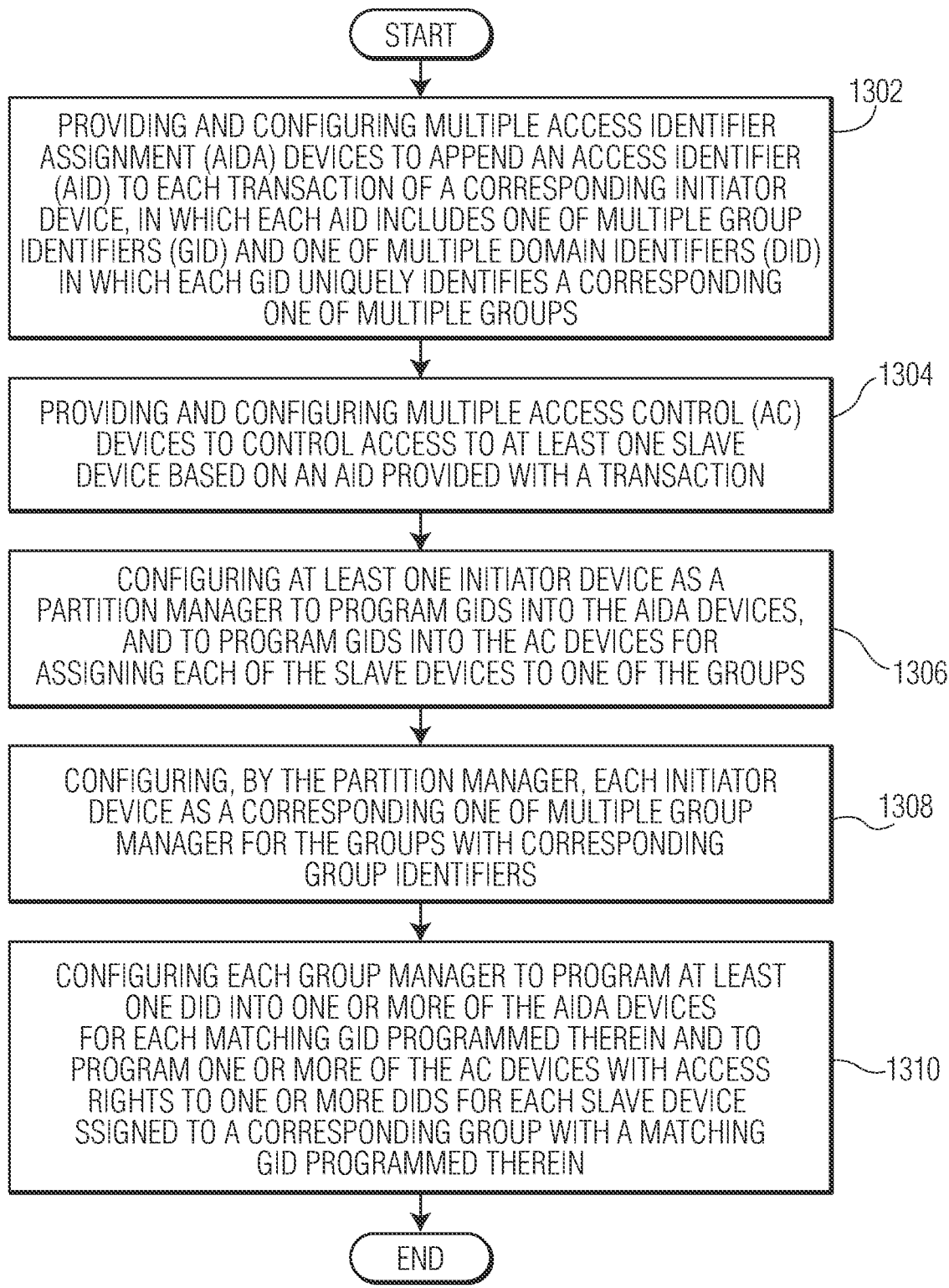
FIG. 13 is a flowchart diagram illustrating an exemplary method that may be performed to provide multiple level resource isolation for an SoC that includes multiple initiator devices that are configured to conduct transactions with multiple slave devices via an interconnect according to one embodiment.

FIG. 13 is a flowchart diagram illustrating an exemplary method that may be performed to provide multiple level resource isolation for a System-on-a-Chip (SoC) that includes multiple initiator devices that are configured to conduct transactions with multiple slave devices via an interconnect according to one embodiment. At a first block 1302, the method may include providing an access identifier assignment (AIDA) device for each of multiple initiator devices and configuring each AIDA device to append an access identifier (AID) to each transaction of a corresponding initiator device, in which each AID includes one of multiple group identifiers (GID) and one of multiple domain identifiers (DID) in which each GID uniquely identifies a corresponding one of multiple groups and in which each DID distinguishes between one or more domains in each group. For embodiments with expanded hierarchical structure, such as including multiple partition managers as shown in FIG. 12, each AID may include additional identifiers, such as a PID or the like.

At a next block 1304, the method may include providing and configuring multiple access control (AC) devices to control access to each of one or more slave devices or slave device ranges based on an AID provided with a transaction. As previously described, each AC device may be configured in any manner suitable and appropriate for a corresponding slave device, such as a slot-based ID access control (SIDAC) device or a range-based ID access control (RIDAC) device or other AC device configuration.

At a next block 1306, the method may include configuring each of one or more of the initiator devices as a partition manager to program GIDs into the AIDA devices to assign each initiator device for use on one or more groups, and to program one or more GIDs into the AC devices for assigning each of the slave devices or slave device ranges to one of the groups. A single partition manager may be suitable for some configurations for establishing one or more groups each with one or more domains. Multiple partition managers may be suitable for expanded hierarchical structure embodiments as shown in FIG. 12.

At a next block 1308, the method may include configuring, by a partition manager (or by each partition manager when multiple partition managers are provided), each of the initiator devices as a corresponding one of multiple group managers with corresponding group identifiers for managing the groups. At a next block 1310, the method may include configuring each group manager to program at least one DID into one or more of the AIDA devices for each matching GID programmed therein and to program one or more of the AC devices with access rights to one or more DIDs for each slave device or slave device range assigned to a corresponding group with a matching GID programmed therein. As previously described, allocation of resources to the groups can either be done all together by a (or each) partition manager in the beginning before starting any of the group managers, or incrementally in which each group and corresponding group manager can be allocated and started one at a time.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims. For example, the present disclosure describes a multiple level SoC resource allocation and isolation system and method illustrated with only two levels of control by partitioning into groups and domains within each group. Additional levels may be defined, such as 3 levels as shown in FIG. 12 or more levels with corresponding configurations and registers to provide access and control parameters to authorized entities at different levels.

The terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A System-on-a-Chip (SoC), comprising:
a plurality of initiator devices, each configured to conduct transactions with addressed ones of a plurality of slave devices via an interconnect;
a plurality of access identifier assignment (AIDA) devices, each configured to append an access identifier (AID) to each transaction of a corresponding initiator device, wherein each AID comprises one of a plurality of group identifiers (GID) and one of a plurality of domain identifiers (DID) in which each GID uniquely identifies a corresponding one of a plurality of groups;
a plurality of access control (AC) devices, each configured to control access to at least one slave device based on an AID provided with a transaction;
at least one of the initiator devices configured as a partition manager is arranged to program GIDs into the AIDA devices, and to program GIDs into the AC devices for assigning each of the slave devices to one of the plurality of groups; and each of a plurality of the initiator devices configured by the partition manager as a corresponding one of a plurality of group managers for the plurality for groups with corresponding group identifiers, wherein each of the plurality of group managers is configured to program at least one DID into one or more of the AIDA devices for each matching GID programmed therein, and is configured to program one or more of the AC devices with access rights to one or more DIDs for each slave device assigned to a corresponding group with a matching GID programmed therein.

2. The SoC of claim 1, wherein each of the plurality of AIDA devices comprises a plurality of configuration registers organized as a plurality of slots that are configured to be programmed with a plurality of AIDs in which the corresponding initiator device is configured to provide a selector with each transaction that selects one of the plurality of AIDs, wherein the partition manager is configured to program a GID into each of the plurality of slots of each AIDA device, and wherein only a group manager having a matching GID of a slot is authorized to program a DID into the slot.

3. The SoC of claim 1, wherein the plurality of AC devices includes a plurality of slot-based ID access control (SIDAC) devices each comprising a plurality of configuration registers organized as a plurality of slots, wherein each of the plurality of slots is configured to be programmed by the partition manager with a GID that identifies a corresponding one of the plurality of group managers that is authorized to program the slot, and wherein each of the plurality of slots comprises at least one field that is configured to be programmed by an authorized group manager with read and write permissions for each of a plurality of DIDs.

4. The SoC of claim 3, wherein the read and write permissions are initially programmed for no accessibility, wherein the read and write permissions are changed to full accessibility when the GID is programmed by the partition manager, and wherein the read and write permissions are changed to no accessibility when the GID is reset.

5. The SoC of claim 3, wherein each of the plurality of slots comprises a visitor field that stores an AID of a visitor entity providing a GID that does not match the authorized GID of the slot, and wherein each slot further stores read and write permissions for the visitor entity.

6. The SoC of claim 1, wherein the plurality of AC devices includes a plurality of range-based ID access control (RIDAC) devices each comprising a first plurality of configuration registers organized as a first plurality of slots, and wherein each of the first plurality of slots is configured to be programmed by the partition manager with a global memory range and a list of GIDs that are authorized to access the corresponding global memory range.

7. The SoC of claim 6, wherein each of the plurality of RIDAC devices comprises a second plurality of configuration registers organized as a second plurality of slots, wherein each of the second plurality of slots is configured to be programmed by the partition manager with a GID that identifies only one group manager with a matching GID that is authorized to program the slot, wherein each of the second plurality of slots comprises at least one field that is configured to be programmed by an authorized group manager with a memory segment and read and write permissions of the memory segment for each of a plurality of DIDs, and wherein each of the first plurality of slots is configured to be programmed by the authorized group manager with a pointer to at least one of the second plurality of slots of the second plurality of configuration registers.

8. The SoC of claim 7, wherein the read and write permissions are initially programmed for no accessibility, wherein the read and write permissions are changed to full accessibility when the GID is programmed by the partition manager, and wherein the read and write permissions are changed to no accessibility when the GID is reset.

9. The SoC of claim 7, wherein the authorized group manager is prevented from programming the pointer when the memory segment of a slot of the second plurality of slots is not wholly contained within the global memory range programmed into the slot of the first plurality of slots pointed to by the pointer.

10. The SoC of claim 7, wherein each of the second plurality of slots comprises a visitor field that stores an AID of a visitor entity providing a GID that does not match the authorized GID of the slot, and wherein each of the second plurality of slots is further configured to be programmed with read and write permissions for the visitor entity.

11. The SoC of claim 1, wherein:
a first one of the plurality of initiator devices comprises a controller including a plurality of channel registers and an engine;
wherein a first one of the plurality of AIDA devices is configured to append an AID to each transaction of the engine; and
wherein a first one of the plurality of AC devices is configured to control access to at least one of the plurality of channel registers of the controller.

12. The SoC of claim 11, further comprising:
a memory and a second one of the plurality of AC devices configured to control access to a selected memory segment within the memory;
wherein the first one of the plurality of AC devices is programmed to allow access to program a selected one of the plurality of channel registers of the controller using a first AID; and
wherein the first one of the plurality of AIDA devices and the second one of the plurality of AC devices are programmed to allow the controller to access the selected memory segment using a second AID.

13. The SoC of claim 12, wherein the first and second AIDs have different DIDs within the same one of the plurality of groups.

14. The SoC of claim 12, wherein the first and second AIDs have different GIDs to enable sharing between different groups.

15. The SoC of claim 11, wherein the controller comprises a selected one of a direct memory access (DMA) controller and an Ethernet controller.

16. The SoC of claim 1, further comprising:
an identification register that is configured to provide a selector to a first one of the AIDA devices programmed to append selected AIDs to a first one of the plurality of initiator devices comprising a core; and
wherein the core executes sharing software that is configured to program the identification register with a selector that corresponds with a group and domain that is controlling the sharing software.

17. The SoC of claim 16, wherein the identification register is external to the core in which the sharing software generates a transaction with transaction selector information used to program the identification register.

18. The SoC of claim 1, further comprising:
counter circuitry that is configured to provide a selector to a first one of the AIDA devices programmed to append selected AIDs to a first one of the plurality of initiator devices comprising a core, and that is configured to provide a switch indication to the core;

wherein the core executes a plurality of hardware threads selected by the switch indication; and a timer that provides a timeout indication to the counter circuitry for selecting a different one of the hardware threads and to select a different one of a corresponding plurality of AIDs.

19. The SoC of claim 1, wherein:

each AID further comprises one of a plurality of partition identifiers (PID) identifying a corresponding one of a plurality of partition managers;

wherein each of a plurality of the initiator devices is configured as a corresponding one of the plurality of partition managers;

wherein each of a plurality of the initiator devices programs GIDs owned by a corresponding partition manager into the AIDA devices and into the AC devices; and wherein each of a plurality of the initiator devices is configured by a corresponding one of the plurality of partition managers as a corresponding one of a plurality of group managers for the plurality for groups with corresponding group identifiers owned by the corresponding partition manager.

20. A method of providing multiple level resource isolation in a System-on-a-Chip (SoC) including a plurality of initiator devices that are configured to conduct transactions with a plurality of slave devices via an interconnect, the method comprising:

providing a plurality of access identifier assignment (AIDA) devices including an AIDA device for each of the plurality of initiator devices, and configuring each AIDA device to append an access identifier (AID) to each transaction of a corresponding initiator device, wherein each AID comprises one of a plurality of group identifiers (GID) and one of a plurality of domain identifiers (DID) in which each GID uniquely identifies a corresponding one of a plurality of groups and in which each DID distinguishes between one or more domains in each group;

providing and configuring a plurality of access control (AC) devices to control access to at least one slave device or slave device range based on an AID provided with a transaction;

configuring each of one or more of the plurality of initiator devices as a partition manager to program GIDs into the AIDA devices, and to program GIDs into the AC devices for assigning each of the slave devices or slave device ranges to one of the plurality of groups; and configuring, by the partition manager, each of a plurality of the initiator devices as a corresponding one of a plurality of group managers with corresponding group identifiers for the plurality for groups; and configuring each of the plurality of group managers to program at least one DID into one or more of the AIDA devices for each matching GID programmed therein and to program one or more of the AC devices with access rights to one or more DIDs for each slave device or slave device range assigned to a corresponding group with a matching GID programmed therein.

* * * * *